(12) United States Patent
Brothers et al.

(10) Patent No.: US 8,842,663 B2
(45) Date of Patent: Sep. 23, 2014

(54) SITUATIONAL AWARENESS INTEGRATED NETWORK AND SYSTEM FOR TACTICAL INFORMATION AND COMMUNICATIONS

(75) Inventors: Louis R. Brothers, Vienna, VA (US);
Keith F. Conner, Boonton, NJ (US);
Joseph W. Davis, Union City, PA (US);
Alan Trojan, Wayne, NJ (US);
Christopher L. Weimer, West Milford, NJ (US); Mark A. Serrano, Dumont, NJ (US)

(73) Assignee: BAE Systems Information and Electronic Systems Integration Inc., Nashau, NH (US)

( * ) Notice: Subject to any disclaimer, the term of this patent is extended or adjusted under 35 U.S.C. 154(b) by 384 days.

(21) Appl. No.: 13/383,113

(22) PCT Filed: Apr. 22, 2011

(86) PCT No.: PCT/US2011/033548
§ 371 (c)(1),
(2), (4) Date: Feb. 20, 2012

(87) PCT Pub. No.: WO2011/133845
PCT Pub. Date: Oct. 27, 2011

(65) Prior Publication Data
US 2012/0140767 A1  Jun. 7, 2012

Related U.S. Application Data

(60) Provisional application No. 61/326,932, filed on Apr. 22, 2010, provisional application No. 61/326,926, filed on Apr. 22, 2010, provisional application No. 61/326,941, filed on Apr. 22, 2010, provisional application No. 61/326,935, filed on Apr. 22, 2010.

(51) Int. Cl.
*H04L 12/66* (2006.01)
*H04L 29/08* (2006.01)
*H04M 7/12* (2006.01)

(52) U.S. Cl.
CPC ............ *H04L 12/66* (2013.01); *H04L 67/2823* (2013.01); *H04M 7/1205* (2013.01); *H04L 67/12* (2013.01); *H04L 67/24* (2013.01)
USPC ......................................................... 370/352

(58) Field of Classification Search
USPC ...................................... 370/352, 401, 395.5
See application file for complete search history.

(56) References Cited

U.S. PATENT DOCUMENTS

| 8,676,234 B2 | 3/2014 | Conner et al. |
| 8,688,107 B2 | 4/2014 | Conner et al. |
| 2005/0053221 A1* | 3/2005 | Reding et al. ............. 379/211.02 |
| 2009/0029672 A1* | 1/2009 | Manz ......................... 455/404.2 |
| 2009/0064295 A1 | 3/2009 | Budampati et al. |
| 2012/0136954 A1 | 5/2012 | Davis et al. |

* cited by examiner

Primary Examiner — Mohammad Anwar
(74) Attorney, Agent, or Firm — Leo Zucker; Daniel J. Long

(57) ABSTRACT

A system for enabling interoperability among various kinds of communications equipment and information transmission formats on the battlefield or during tactical missions. The system includes a multi-message translator (MMT) for translating a source text message having a first set of word fields defined according to a source message format, into a sink message having a second set of word fields defined according to a sink message format. The system also includes a voice bridging gateway (VBG) for bridging multiple voice communication networks having associated transmission protocols that are incompatible with one another. Dismounted soldiers obtain location based services including geo-referenced maps, and tactical communications including voice and text messaging, using smart phones or other lightweight COTS client devices that link through a personal networking node (PNN) server to one or both of the MMT and the VBG.

18 Claims, 26 Drawing Sheets

MMT COMMON SYSTEMS VS. MESSAGE TYPES MATRIX

| COMMON SYSTEMS | MESSAGE STANDARDS | | | |
|---|---|---|---|---|
| | CURSOR ON TARGET (CoT) | VARIABLE MESSAGE FORMAT (VMF) | J-MESSAGES | SAINT |
| LAND WARRIOR | | X | | |
| FBCB2 | | X | | |
| RAPTORX | X | | | |
| SAINT | | | | X |
| ADSI | | | X | |
| REMOTE MMTS | X | X | X | X |

FIG. 10

MMT COMMON SYSTEMS VS. TRANSPORT TYPES MATRIX

| COMMON SYSTEMS | TRANSPORT TYPES | | | | | |
|---|---|---|---|---|---|---|
| | UDP | TCP | MULTICAST UDP | PNN XMPP | FILE |
| LAND WARRIOR | | | X | | X |
| FBCB2 | | | X | | X |
| RAPTORX | X | | | | X |
| SAINT | | | | X | X |
| ADSI | X | X | X | | X |
| REMOTE MMTS | X | X | X | | X |

FIG. 11

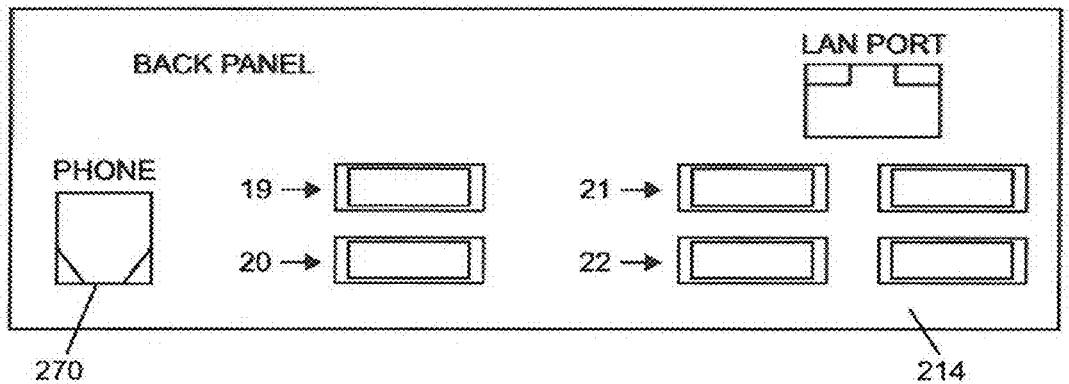

FIG. 21

| | Command | Radio Configuration | Description |
|---|---|---|---|
| 1 | saint_rpt.sh | no_radios | Disable Radio Channel |
| 2 | | radio1_2_3_4 | Independent Radios |
| 3 | | radio12_3_4 | Radio 1 and 2 are bridged |
| 4 | | radio1_23_4 | Radio 2 and 3 are bridged |
| 5 | | radio1_2_34 | Radio 3 and 4 are bridged |
| 6 | | radio13_2_4 | Radio 1 and 3 are bridged |
| 7 | | radio14_2_3 | Radio 1 and 4 are bridged |
| 8 | | radio1_24_3 | Radio 2 and 4 are bridged |
| 9 | | radio1_234 | Radio 2, 3, and 4 are bridged |
| 10 | | radio123_4 | Radio 1, 2, and 3 are bridged |
| 11 | | radio124_3 | Radio 1, 2, and 4 are bridged |
| 12 | | radio134_2 | Radio 1, 3, and 4 are bridged |
| 13 | | radio12_34 | Radio 1, 2 are bridged. Radio 3 and 4 are bridged |
| 14 | | radio13_24 | Radio 1, 3 are bridged. Radio 2 and 4 are bridged |
| 15 | | radio14_23 | Radio 1, 4 are bridged. Radio 2 and 3 are bridged |
| 16 | | radio1234 | All Radios are bridged. |

FIG. 22

SITUATIONAL AWARENESS INTEGRATED NETWORK AND SYSTEM FOR TACTICAL INFORMATION AND COMMUNICATIONS

CROSS REFERENCE TO RELATED APPLICATIONS

This application claims priority under 35 U.S.C. Sec. 119 (e) of U.S. Provisional Patent Applications No. 61/326,926 filed Apr. 22, 2010 titled Method and Apparatus to Provide a Situational Awareness Integrated Network Technologies (SAINT) System; No. 61/326,935 filed Apr. 22, 2010 titled Method and Apparatus for a Multi-Message Translator (MMT); No. 61/326,932 filed Apr. 22, 2010 titled Method and Apparatus for a Voice Bridge. Gateway (VBG); and No. 61/326,941 filed Apr. 22, 2010 titled Method and Apparatus to Provide a Personal Networking Node (PNN); all of which were filed Apr. 22, 2010, and are incorporated herein by reference in their entireties.

BACKGROUND OF THE INVENTION

1. Field of the Invention

The present invention concerns tactical communications networks, particularly a network that provides situational awareness information to dismounted soldiers and enables them to exchange messages with one another and their line of command.

2. Discussion of the Known Art

Individual soldiers engaged in tactical operations or missions must be informed continuously of the status of a given mission and their current orders, typically by way of voice and/or text message communications. The soldiers must also be able to communicate their condition and progress to their chain of command, including the locations of new targets that they identify, and calls for fire or to adjust fire. Unfortunately, many of the various military and commercial radios and networks currently available for use by individual dismounted soldiers are not compatible with one another, thus making it difficult if not impossible to communicate tactical information quickly and reliably to and from the front line. Moreover, there are no known location based services that can provide tactical geo-referenced information (e.g., maps showing a soldier's location, the locations of buddies, hostiles, targets, and other points of interest) to the dismounted soldier. And there is also a lack of secure gateways that allow interoperability among legacy tactical communications systems. A need therefore exists for a reliable network and system for communicating important tactical information including text, voice and imagery, to and from the dismount regardless of the particular radios, networks, or other communications devices being deployed.

SUMMARY OF THE INVENTION

According to the invention, a system for enabling interoperability among various kinds of communications equipment and information transmission formats in a tactical environment includes a multi-message translator (MMT) for translating a source text message having a first set of word fields defined according to a source message format, into a sink message having a second set of word fields defined according to a sink message format. The system also includes a voice bridging gateway (VBG) for bridging multiple voice communication networks having associated transmission protocols that are incompatible with one another. Dismounted soldiers obtain location based services including geo-referenced maps, and tactical communications including voice and text messaging, using programmable smart phones or other lightweight COTS devices that are linked through a personal networking node (PNN) server to one or both of the MMT and the VBG.

For a better understanding of the invention, reference is made to the following description taken in conjunction with the accompanying drawing and the appended claims.

BRIEF DESCRIPTION OF THE DRAWING

In the drawing:

FIG. 10 is a table identifying message standards or formats for certain tactical communications networks;

FIG. 11 is a table identifying transports used for the networks in the table of FIG. 10;

FIG. 21 shows a panel of a VBG server including a number of USB ports and a telephone communication cable connector, according to the invention;

FIG. 22 is a table defining different bridging configurations of the inventive VBG for four different radio networks;

DETAILED DESCRIPTION OF THE INVENTION

The present invention is directed to a communications gateway system and technique that extends the common operating picture (COP) to the tactical edge by distributing geospatially relevant information among various participants on a given tactical mission. Referred to herein Situational Awareness Integrated Network Technologies or SAINT, the inventive system leverages commercial technology and networks to provide a warfighter with on-demand location based services. The system's capabilities include wireless communications using commercial off the shelf (COTS) fixed/mobile base stations, IEEE 802.11 wireless access, and/or existing tactical radios; geo-referenced blue force tracking, targeting, and imaging (still and video); and gateway functionality among commercial radios and networks, military radios and networks, and commercial and military applications including MOTOTRBO, Garmin radios, SOF, and Army networks such as Land Warrior, Raptor X (SOF GIS), PRC-117G, SINCGARS, and Force XXI Battle Command Brigade and Below (FBCB2). The geo-referenced information may be imported from outside sources such as Land Warrior, shared by a community of local users, and exported to outside consumers of interest such as FBCB2 or CPOF.

The inventive SAINT system includes an application that operates on COTS handheld hardware including smart phones, cell phones, rugged PDAs, and UMPCs that can be easily carried by soldiers on the ground. These hardware devices may also use commercial cellular and/or IEEE 802.11 access protocols. SAINT also allows voice interoperability between COTS mobile phones and tactical PTT radios, as well as message or data interoperability across heterogeneous networks (e.g., JVMF over EPLRS, to CoT over SINCGARS).

Figure 1:
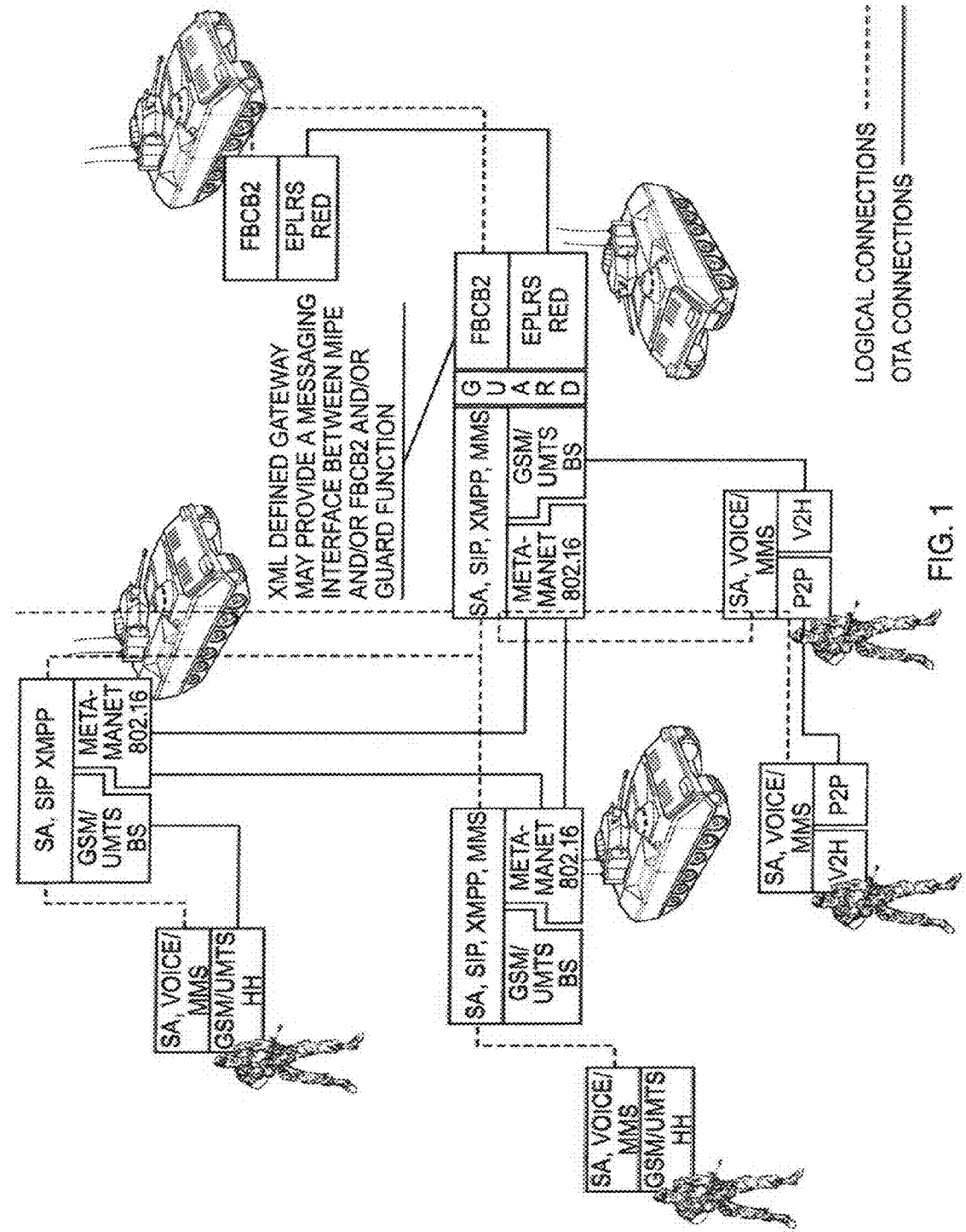
FIG. 1 is a pictorial representation of a tactical communications system wherein situational awareness (SA) and other information and data from multiple sources, is communicated to dismounted soldiers equipped with conventional handheld communications devices while on a mission, according to the invention.

FIG. 1 illustrates the use of SAINT to provide secure location based services at low cost to tactical users, including individual dismounted soldiers carrying COTS cellular phones or other standard communications device having a display screen. SAINT offers self protection by informing each warfighter of the locations of designated buddies and the locations of hostiles. The inventive system also allows the warfighter to view a secure geo-referenced tactical map with points of interest (POIs) and other imagery, enables push-to-talk (PTT) operation of tactical radios such as SINCGARS, and provides interoperablity with various databases and Command and Control (C2) applications (e.g., Land Warrior and FBCB2).

The geo-referenced map features thumb friendly pop-up menus that allow the user of to (a) add, modify, or attach comments or media files to POIs, (b) find, follow, and connect quickly to buddies, (c) access geo-referenced information such as pictures, and (d) obtain bearing and distance information to POIs. Buddy lists provide status information and a quick interface for finding and collaborating with other users. SAINT also allows group or individual text chat with visual indications to confirm delivery.

SAINT Multi-Message Translator (MMT)

The tactical message gateway component of SAINT, referred to herein as a Multi-Message Translator or MMT, is described in detail as follows.

Basically, the inventive MMT enables SA/C2 message interoperability, routing, and filtering among systems that employ disparate military and commercial messaging, transport, and networking protocols. The MMT supports both event and polling-based message distribution, and has a modular architecture that allows new message formats and profiles to be quickly incorporated. In one preferred embodiment, the inventive translator uses Extensible Markup Language (XML) to define routing and filtering rules so that any existing routing or filtering semantics can be preserved in the MMT system. Every message transaction can be logged in an intermediate, common message format that may be accessed by an embedded or enterprise database, and the translator can support centralized or distributed deployments. Open-standard format support can include, for example, TDL-J/Link 16, JREAP C, Variable Message Format (VMF), Cursor-on-Target (CoT), US SOCOM SA/C2, XMPP, UDP, TCP, IPv4, IPv6, and Multicast. The MMT can also be configured to support multiple proprietary message formats for specific customer communities, and be implemented on a variety of COTS and GOTS server hardware systems using, e.g., Java.

The MMT is configured to convert the format of each incoming message or data originating from a given source into an intermediate common message format (CMF), wherein each data or word field of the incoming message is mapped into a corresponding word field of the CMF. Data or information mapped into a given field in the CMF is then mapped into a corresponding field of an outgoing (or sink) message format recognized by each network or node to which the message is destined. The incoming messages may also be regarded as connectors into external programs that originate the messages or data sets, and the sink messages as connectors into external programs designated to receive the incoming messages or data. The MMT may therefore operate to distribute messages even when an incoming message and an intended recipient each use the same message format.

Examples of data sources include, but are not limited to:
1. Laser Range Finder
2. Radio Host Controllers (for messages generated by the rest of the network)
3. Simulated Message Generators (Trackserver, etc.)
4. ADSI
5. Saint—Personal Network Node (PNN)

Examples of data sinks include, inter alia;
1. SA Displays (World Wind, Google Maps, Raptor X, etc.)
2. Radio Host Controllers (for messages that need to be pushed to the rest of the network)
3. ADSI
4. DBMS
5. PNN In the inventive SAINT system, the intermediate common message format (CMF) embodied in the MMT component is structured with enough data or word fields so that any given field in the CMF corresponds to a word field in the format of any given source or sink message to be processed by the MMT. That is, the word fields of the CMF are a union of all the word fields in the various message formats the MMT is intended accommodate. Preferably, all the data contained in a source message is mapped via the CMF into corresponding word fields in the sink message format, and none of the source message data is initially discarded. If the sink message format has one or more word fields for which no corresponding source message data has been mapped to the CMF, then the MMT may, for example, enter a zero or other null word in the corresponding sink message fields.

Figure 2:
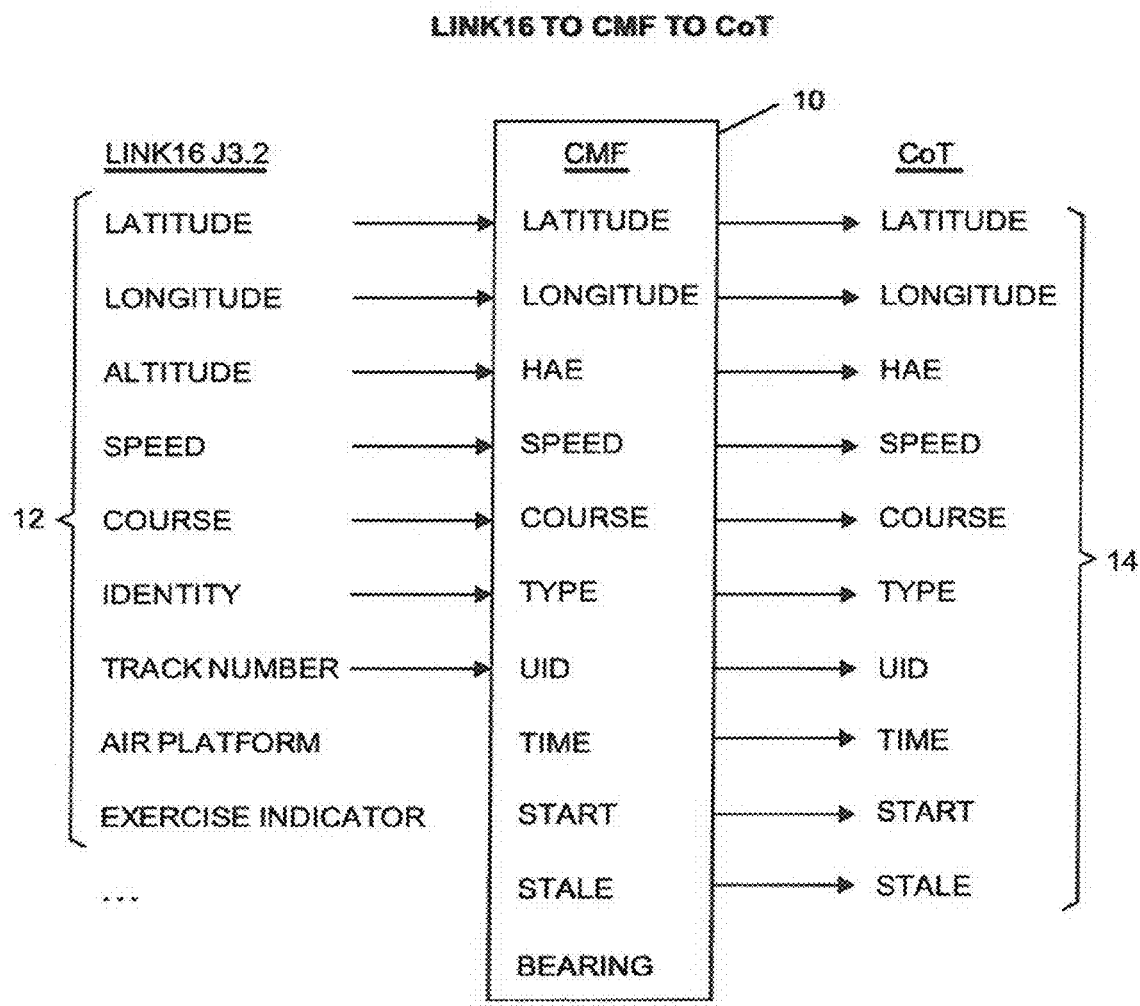
FIG. 2 depicts a translation of a message in a Link 16 format into a corresponding message in a CoT format, according to the invention.

FIG. 2 illustrates the operation of the inventive MMT 10 when translating a Link 16 type J3.2 source message 12 into a CoT formatted sink message 14. Note that each of the data word fields of the intermediate CMF corresponds to word field in either the Link 16 or the CoT format.

Figure 3:
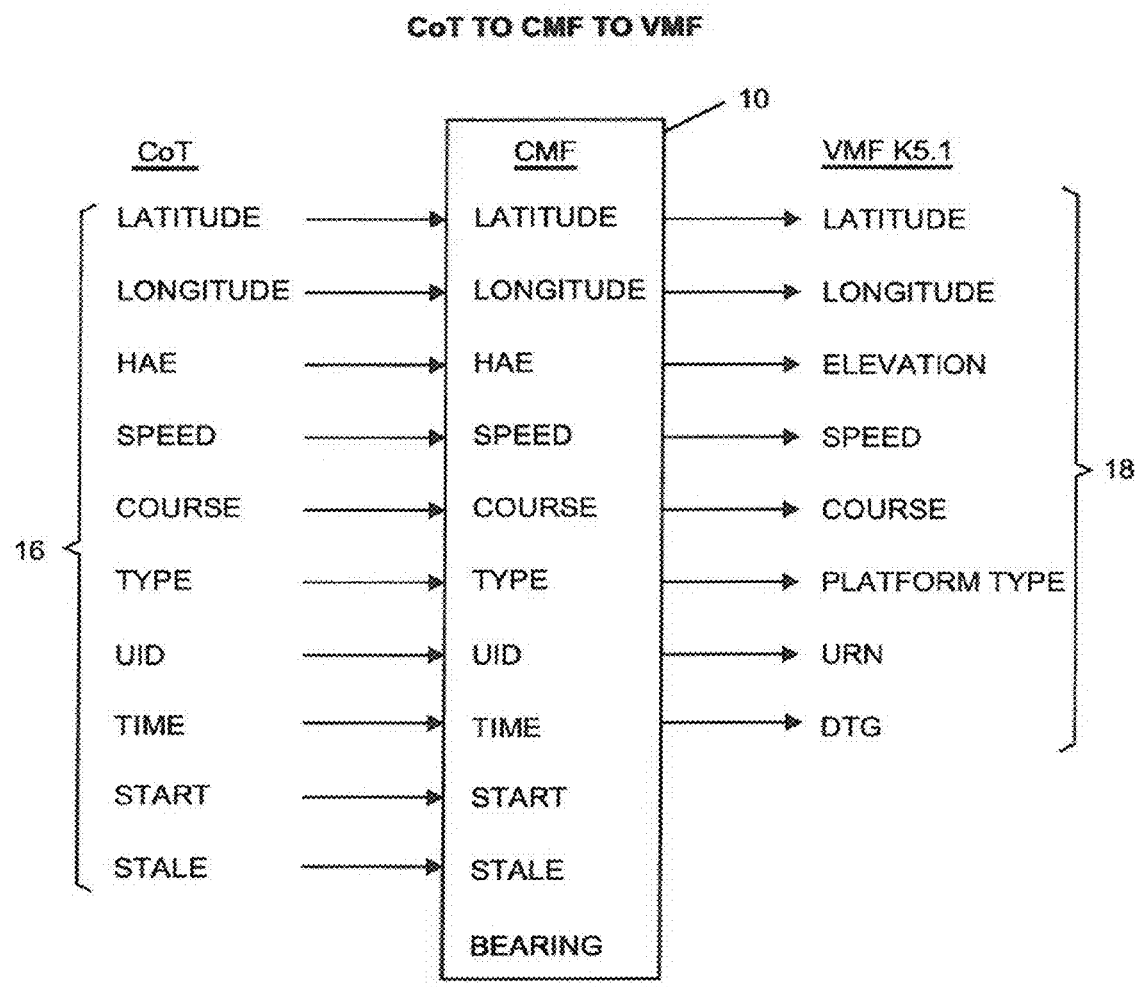
FIG. 3 depicts a translation of a message in a CoT format into a corresponding message in a VMF format according to the invention.

FIG. 3 illustrates the operation of the MMT 10 when translating a CoT source message 16 into a VMF type K5.1 sink message 18. Note again that each of the word fields of the intermediate CMF matches a word field of either the CoT or the VMF format.

Message sources and sinks may be created dynamically during runtime using, for example, an open Java GUI. As detailed below, a GUI may be configured to display a window that shows a real-time animated view of the sources, the sinks, and the messages flowing between them. If the MMT application is written as a Java program, then the server, computer or other hardware platform on which the MMT is run may require the installation of an available Java Runtime Environment (JRE) application and related known programs or files (e.g., jar library files) as would be apparent to a skilled programmer.

Figure 4:
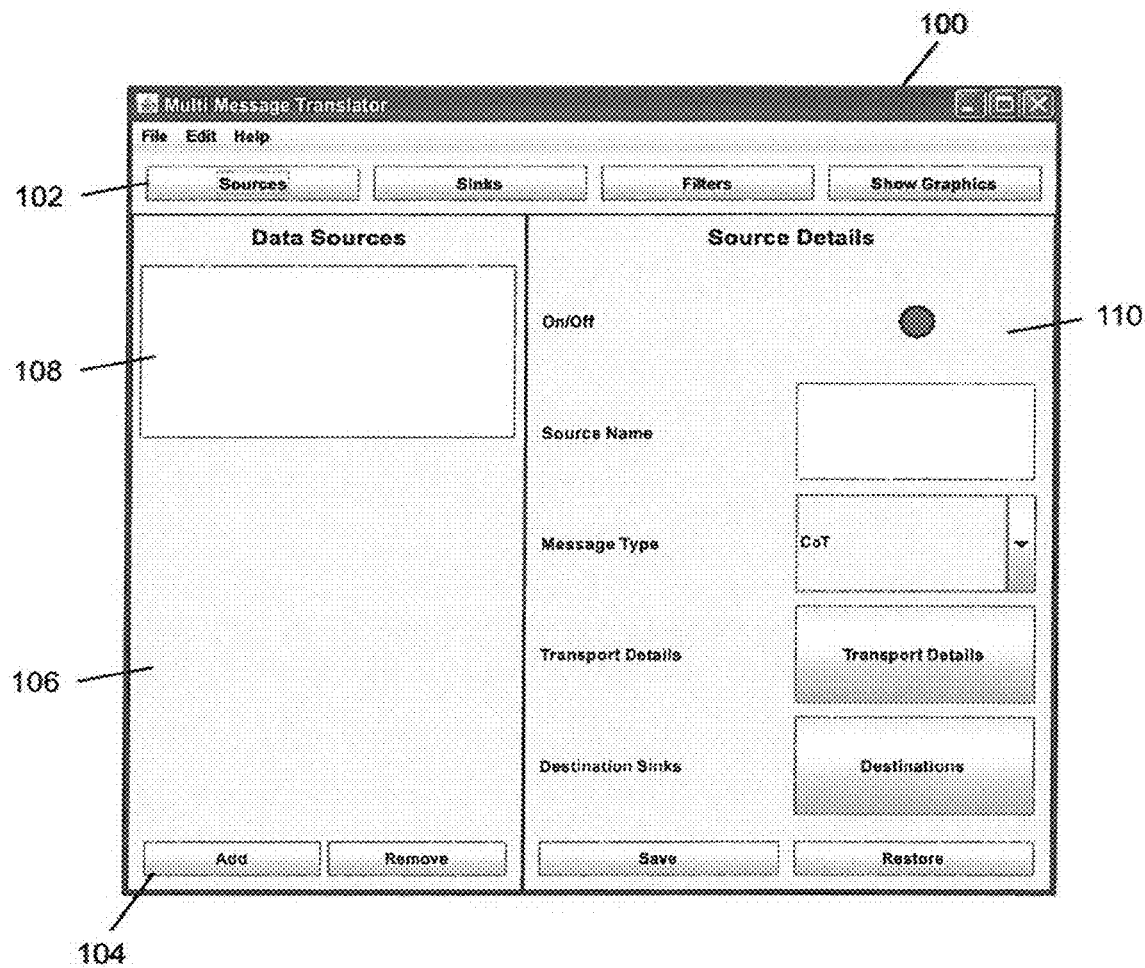
FIGS. 4 to 7 are window screens of a graphical user interface (GUI) that can be used when translating and/or distributing messages according to the invention.
Figure 5:
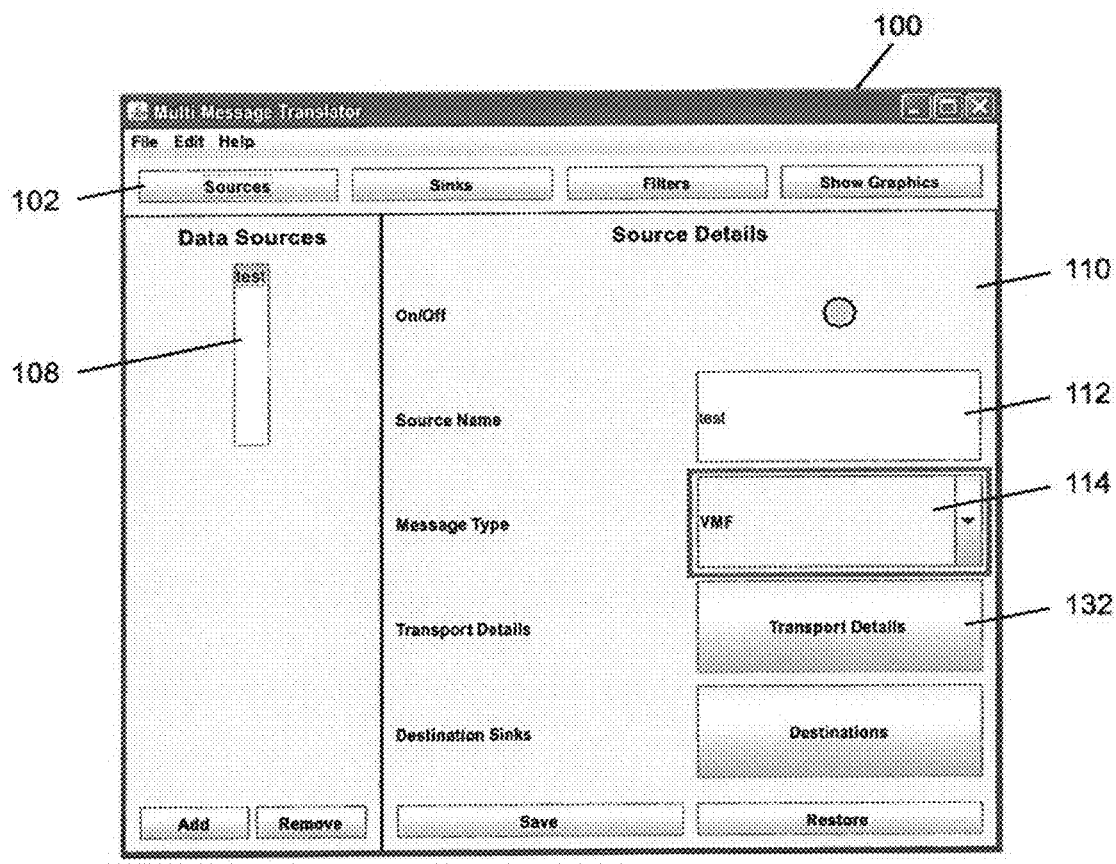

Setting up Data Sources (FIGS. 4 and 5)

FIGS. 4 and 5 show an example of a main window 100 that may be displayed by a server or other hardware platform implementing the MMT. The user clicks on a Sources button 102 at the top left of the window 100, and then clicks an Add button 104 at the bottom of a Data Sources pane 106. Available data sources appear within a Data Sources field 108 inside the pane 106. Preferably, all the listed sources have already been configured on the system, and clicking on a listed source will display certain values corresponding to the source in a Source Details pane 110 at the right of the window 100.

As seen in FIG. 5, when the user selects a data source (e.g., test), the source name is displayed inside a Source Name field 112 in the Source Details pane 110. The message type or format used by the source (e.g., VMF) is then highlighted on a drop-down menu that appears inside a Message Type field 114. Message formats may include, for example:
  CoT (Cursor On Target)
  L16 (Link 16; J-Series Messages)
  VMF (Variable Message Format; K-Series Messages)
  MNUGS (Mesh Node Unattended Ground Sensor)
  PNN (Personal Networking Node)

Figure 6:
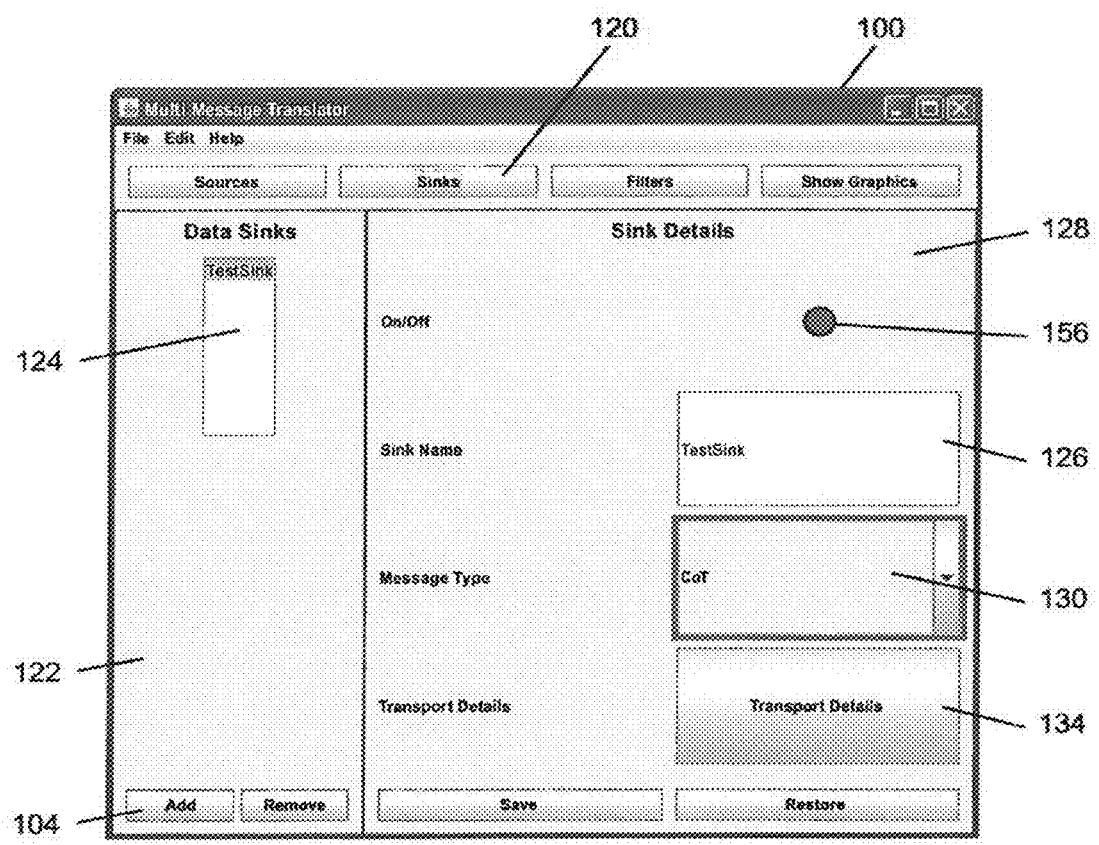
Figure 7:
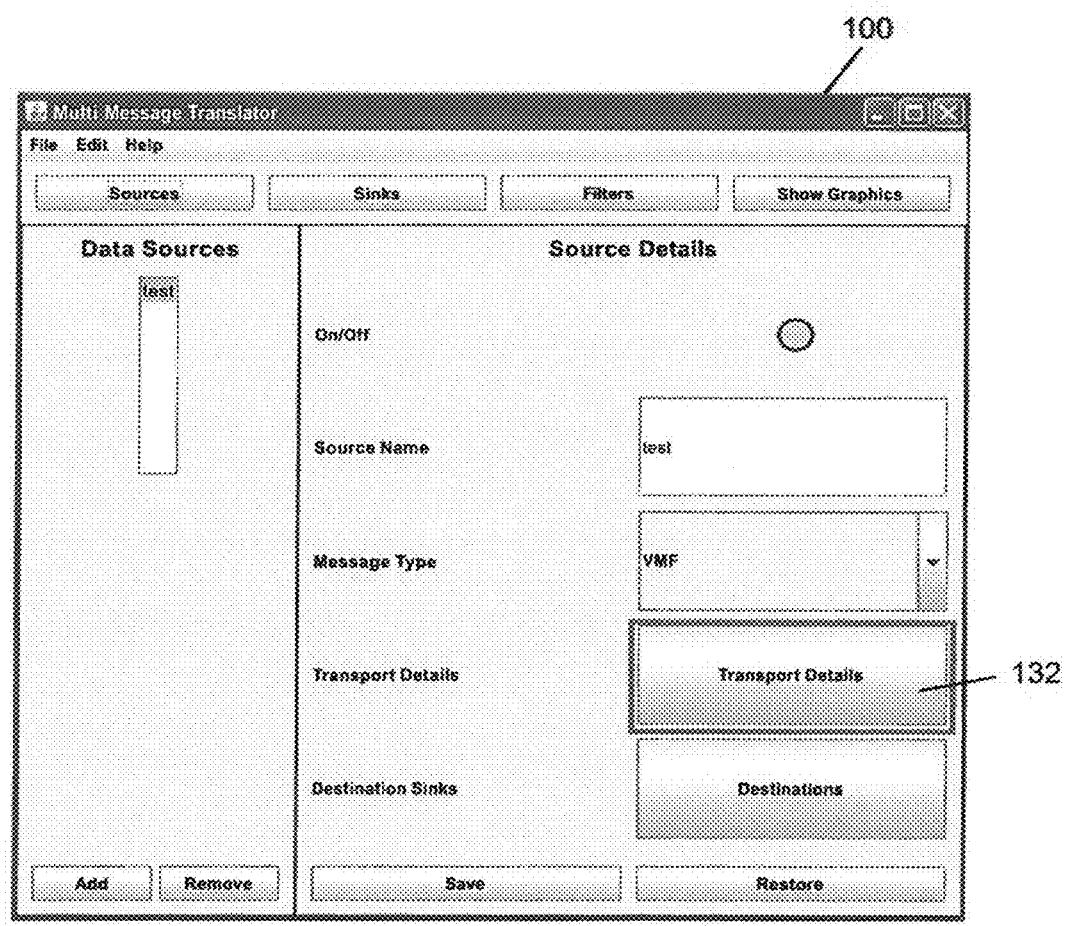

Setting up Data Sinks (FIG. 6)

To set up a data sink, the user clicks a Sinks button 120 at the top of the screen 100, and then clicks the Add button 104 at the bottom of a Data Sinks pane 122 displayed at the left of the screen 100 in FIG. 6. Available data sinks are listed inside a Data Sinks field 124 in the pane 122, and a desired sink is selected by the user from the displayed list. The selected sink name (e.g., TestSink) is displayed inside a Sink Name field 126 within a Sink Details pane 128 at the right of the screen 100 in FIG. 6.

The message type or format used by the data sink (e.g., CoT) is selected from a drop-down menu in a Message Type field 130 in the pane 128. Preferably, the Data Sinks field 124 lists all sinks that have already been configured on the system, and clicking on a given sink causes the values associated with the sink to be displayed in the Sink Details pane 128.

Message formats used by data sinks may include, for example:
  CoT (Cursor On Target)
  L16 (Link 16; J-Series Messages)
  VMF (Variable Message Format; K-Series Messages)
  PNN (Personal Networking Node)

After selecting a source and a sink, the user proceeds to set up a transport.

Setting up Transports (FIGS. 6 to 9)

Figure 8:
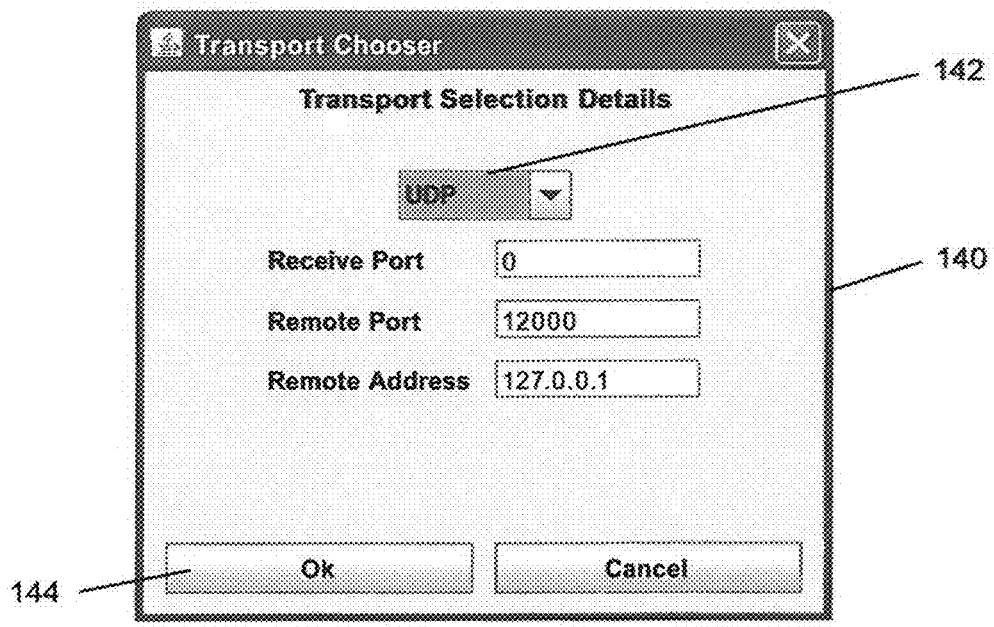
FIGS. 8 and 9 are window panels of the GUI that can be used to choose transports for source and for sink messages according to the invention.
Figure 9:
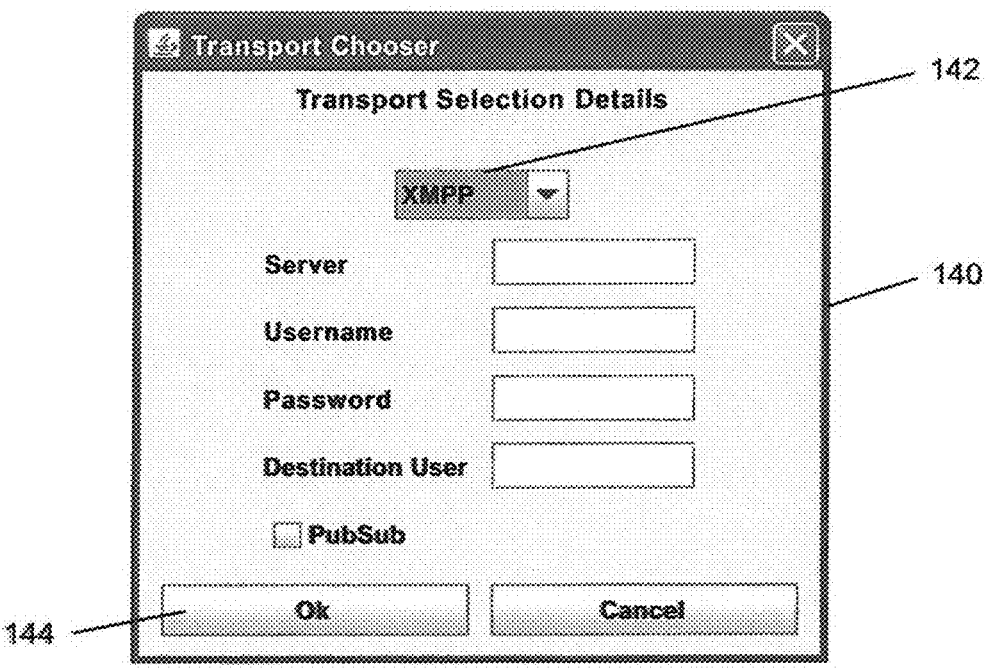

The transport corresponds to the transmission standard to be used for communicating source messages to the MMT 10, and the standard to be used for sending the translated messages from the MMT to the message sinks. Such transmission standards may include, for example:
  UDP
  TCP
  Multicast UDP
  Serial
  XMPP To set up a transport for a source or a sink, the user clicks inside either a Transport Details field 132 displayed in the Source Details pane 110 (FIGS. 5 and 7), or a Transport Details field 134 displayed in the Sink Details pane 128 (FIG. 6), as the case may be. A Transport Chooser panel 140 such as shown in FIGS. 8 and 9 is displayed. The type of transport desired (e.g., UDP in FIG. 8 or XMPP in FIG. 9) is selected from a drop down list 142, and corresponding values are entered depending on the selected transport. After the transport values are entered in the panel 140, the user clicks an OK button 144 and the selected transport is saved in association with the source or the sink currently being edited. FIG. 10 is a table that shows typical message formats or standards used by common tactical communications systems, and FIG. 11 is a table showing the types of transports typically used by the systems.

Figure 12:
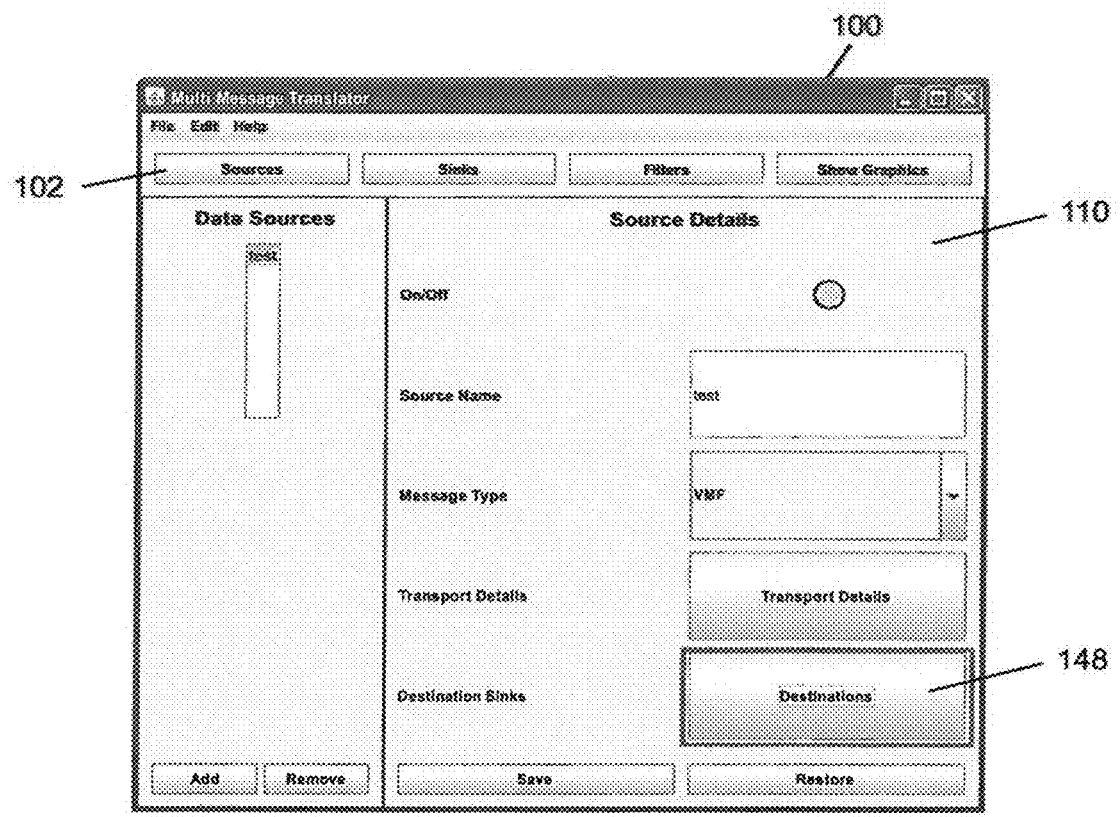
FIGS. 12 and 13 are GUI screens that can be used to connect a selected source to one or more desired sinks after choosing corresponding transports.
Figure 13:
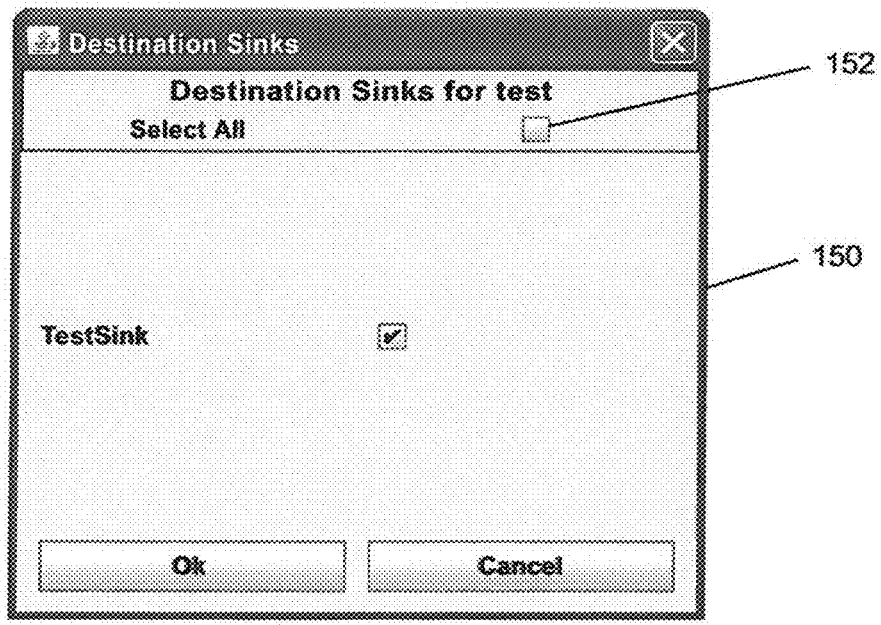

Connecting a Source to a Sink (FIGS. 12 and 13)

Once the user defines the sources, the desired sinks, and their associated transports, each source is logically connected to a desired sink(s). The user returns to the main screen 100, clicks the Sources button 102, and then clicks a Destinations button 148 in the Source Details pane 110 in FIG. 12. A Destination Sinks window 150 is now displayed as in FIG. 13.

The name of each sink currently entered in the MMT 10 is listed in the Destination Sinks window 150, with a corresponding checkbox. The user checks the box or boxes corresponding to one or more sinks to which the currently selected source is to be connected. A Select All option 152 may be provided to connect the current source to all of the saved sinks.

Figure 14:
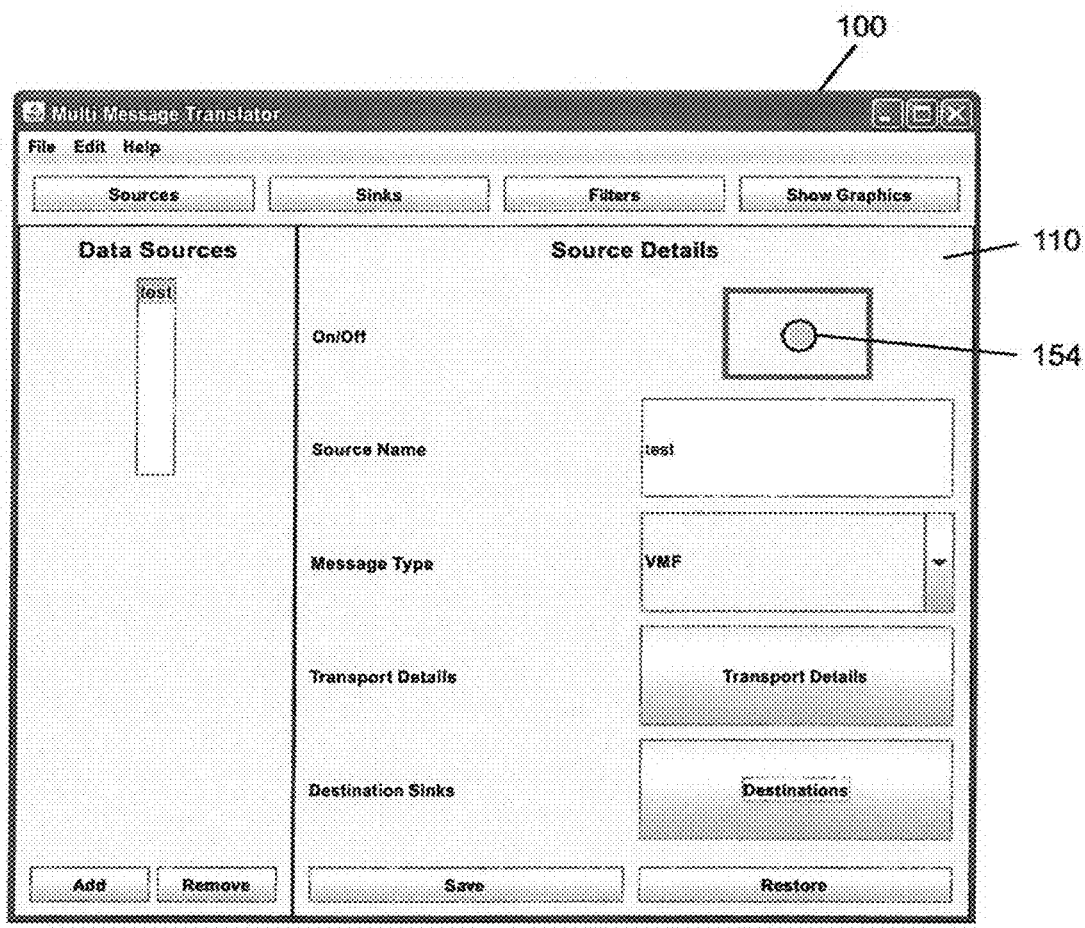
FIG. 14 is a GUI screen that can be used for activating or deactivating a selected source or sink.

Activating or Deactivating a Source or a Sink (FIG. 14)

Once saved in the MMT 10, the message sources and sinks may not be actively connected to the MMT. Accordingly, for example, a red or a green colored circle 154 may be displayed inside the Source Details pane 110, and a like circle 156 displayed inside the Sink Details pane 128 in FIG. 6, to show whether or not a selected source or sink is currently active. Clicking on the circle may then cause the selected entity to toggle between an active and an inactive state with respect to the MMT.

Figure 15:
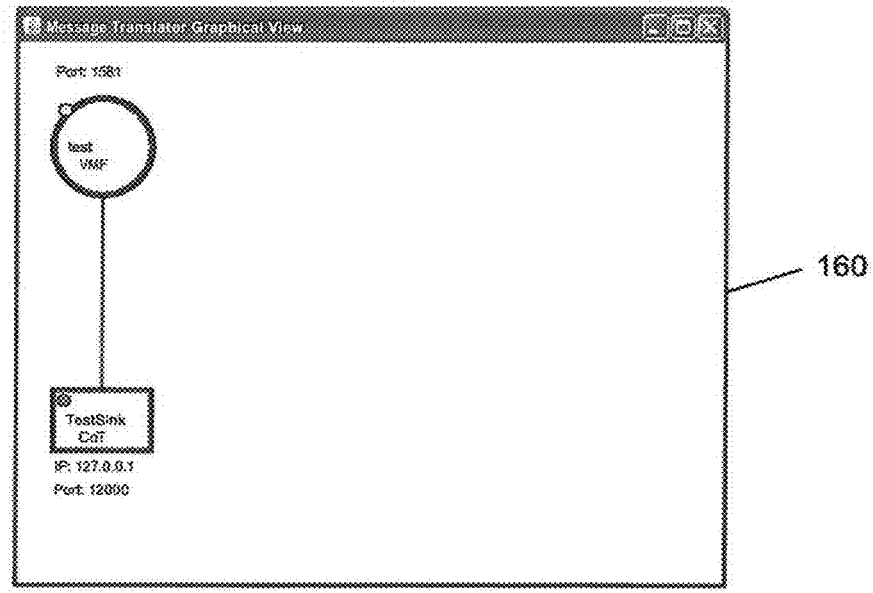
FIGS. 15 and 16 are GUI screens that can be used to illustrate a connection and a message flow from a selected source to one or more selected sinks according to the invention.
Figure 16:
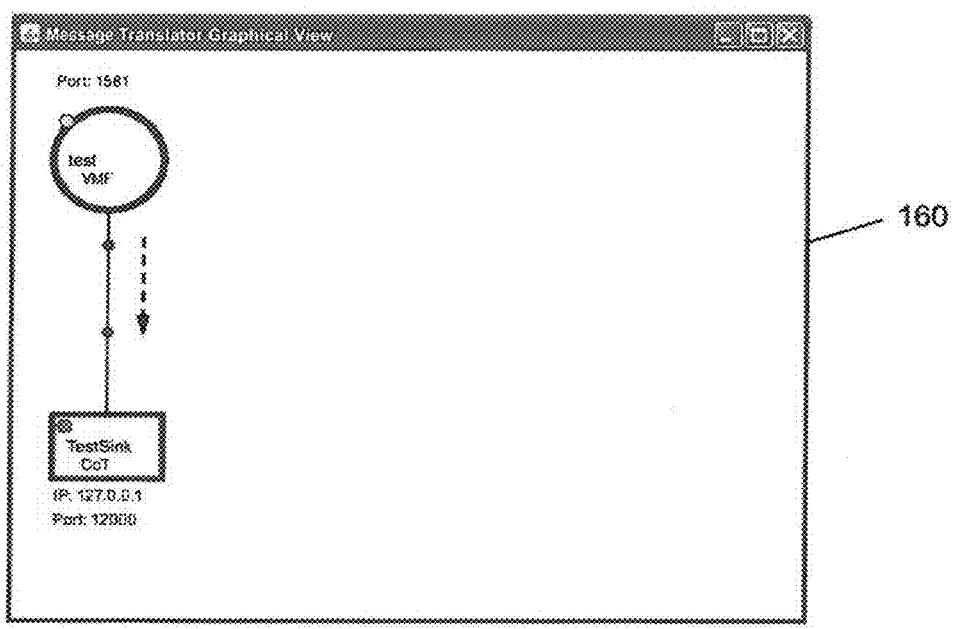

MMT Operational Graphic View (FIGS. 15 and 16)

Upon clicking a Show Graphics button at the top of the main screen 100, a screen 160 may be displayed as shown in FIGS. 15 and 16.

For example, a blue circle at the top of the screen 160 may serve as an icon for a source, and a red rectangle at the bottom of the screen may be an icon for a sink. The name of the source or the sink and its associated message format can be displayed inside the corresponding icon. A small green or red circle may also be displayed on or next to the icons to indicate if the source or sink is currently activated.

Transport specific information may be displayed, e.g., above each source icon and below each sink icon, and a line drawn between a source and a sink to show that the two entities are connected, i.e., that the source will pass any message it generates to the connected sink(s). When a source passes a Message to a sink, a small colored dot may appear to move downwardly along the line connecting the source to the sink. See FIG. 16.

After creating a scenario by linking a source to one or more sinks, the scenario may be saved by clicking, e.g., a File>Save Scenario option provided via the main screen 100. From the File menu, the scenario may be saved with, e.g., a MMT extension. To load a previously saved scenario, the user may click, e.g., a File>Load Scenario option via the main screen 100, and select the previously saved file from the File menu. All sources and sinks previously saved as active are preferably maintained as active when loaded.

Example

Set Up of Source and Sink for Land Warrior

For example, to configure the MMT 10 to connect with the Land Warrior system, several sources and sinks need to be set up. A configuration file may also be needed to map VMF URNs to UIDs used elsewhere in the system. The following steps accomplish these requirements.

In Land Warrior, messages are typically sent and received on multiple multicast groups. For each group, one source and one sink need to be set up.

First, to set up the URN/UID map configuration file:
1. Open or create the file URNMap.xml in an MMT install directory.
2. For each Incoming URN from Land Warrior, add an entry into the tracks element, following the pattern: <Track UID=CDR-TRK-1BN12IN URN=507039/>.
3. The URN corresponds to a Unique Reference Number assigned to each Land Warrior track, and the UID corresponds to a Unique Identifier used by other systems such as a CoT system or the Saint Suite.
4. The user adds an entry for each track that will be pushing into the Land Warrior system. The format is the same.

A Land Warrior system administrator may need to be contacted to negotiate which URNs are being used and which are available.

To set up Land Warrior sources in the MMT 10:
1. Add a new source using the add button 104 in the Data Sources pane 106 of the main screen 100.
2. Give the new source a name.
3. Set the message type to VMF.
4. Click the Transport Details field 132.
5. Select Multicast via the Transport Chooser window 140.
6. Enter the multicast port and address.
7. Click the OK button 144 to exit Transport Chooser.
8. Repeat 1-7 for each multicast group to be received.

To set up Land Warrior sinks in the MMT 10:
1. Add a new sink using the add button 104 in the Data Sinks pane 122 of the main screen 100.
2. Give the new sink a name.
3. Set the message type to VMF.
4. Click the Transport Details field 134.
5. Select Multicast from the Transport Chooser window 140.
6. Enter the multicast port and address.
7. Click the Ok button 144 to exit Transport Chooser.
8. Repeat 1-7 for each multicast group to which messages are to be distributed.

MMT Filters

The inventive MMT 10 is capable of filtering messages based on several different factors. An MMT filter may be configured and used to prevent messages not matching the filter parameters from progressing through the system. That is, a message not matching a filter applied to a given source will be dropped before the message is sent to sinks connected to the source. Configured filters can be applied to either sources or sinks. Applying a filter at a source implies that all messages will be filtered before being sent to the destination sinks connected to the source. Applying a filter at a sink implies that all messages coming from all sources connected to the sink will be filtered prior to the sink receiving the messages in its native format.

Filter Types

The following types of filters may be configured:

Radius Filter: Only allows messages with coordinates that are within a specified radius (in meters) of a specified point (in latitude/longitude) to pass.

UID Filter: Only allows messages with UIDs specified in the filter to pass. This is essentially a white list.

Type Filter: Only allows messages with a type matching the type specified by the filter to pass. For example, the message type is placed in a Type field of the Cursor-on-Target (CoT) message format.

Category Filter: Only allows messages with a category matching the category specified by the filter to pass. For example, values mapped to Categories are 0 for Situational Awareness tracks, and 1 for Text Messages.

Configuring Filters

Filters may be configured by a skilled programmer using, for example, an XML file that is created upon saving a scenario. For example, XML tags that define the different filters may be as follows (variable values are in bold):

UID Filter Example

```
<Filter name=Uid>
    <FilterDetails>
        <Uid value =Test/>
        <Uid value =Test2/>
        <Uid value = BillyBob/>
    <FilterDetails>
    <SubFilters>
        <AndFilters/>
        <OrFilters/>
```

-continued

```
        </SubFilters>
    </Filter>
                Type Filter Example
<Filter name=Type>
        <FilterDetails>
            <Type value =a-f-G/>
            <Type value =a-h-G/>
            <Type value = a-f-A/>
        </FilterDetails>
        <SubFilters>
            <And Filters/>
            <OrFilters/>
        </SubFilters>
    </Filter>
                Category Filter Example
<Filter name=Category>
        <FilterDetails>
            <Category value =0/>
            <Category value =1/>
            <Category value = N>
        </FilterDetails>
        <SubFilters>
            <And Filters/>
            <OrFilters/>
        </SubFilters>
    </Filter>
                Radius Filter Example
<Filter name=Radius>
        <FilterDetails latitude=40.12345 longitude=-74.6789
        radius=100.5/>
            <SubFilters>
            <AndFilters/>
            <OrFilters/>
        </SubFilters>
    </Filter>
```

Running the MMT with Filters

Running the MMT 10 with filters may be performed once the filter is configured in the scenario (e.g., XML) file. The filters preferably load simply upon running the application, and each filter may be displayed in the Graphic View 160 of the system as, e.g., a colored orange box placed on or near the icon of the message source or sink to which the filter is applied. See FIGS. 15 and 16.

The MMT application in SAINT therefore provides an efficient and low cost tool for distributing messages originating in one format, to various networks and receivers configured to detect and decode messages structured in a different format. Tactical situational awareness messages and information from various sources can be distributed, routed, and filtered appropriately. Individual dismounted soldiers can use commercial off-the-shelf cell phones, PDAs, or other common wireless devices both to send and receive messages across inherently incompatible communications platforms.

As mentioned, the SAINT MMT 10 is capable of distributing messages originating in a given format to other networks or nodes configured to receive messages in the same format, with or without the various filters described above. Moreover, a database may be provided or operatively associated with the MMT for identifying or compiling messages that are routed through the translator.

SAINT Voice Bridge Gateway (VBG)

The voice bridging component of SAINT, referred to herein as a Voice Bridge Gateway or VBG, is described in further detail below.

Figure 17:
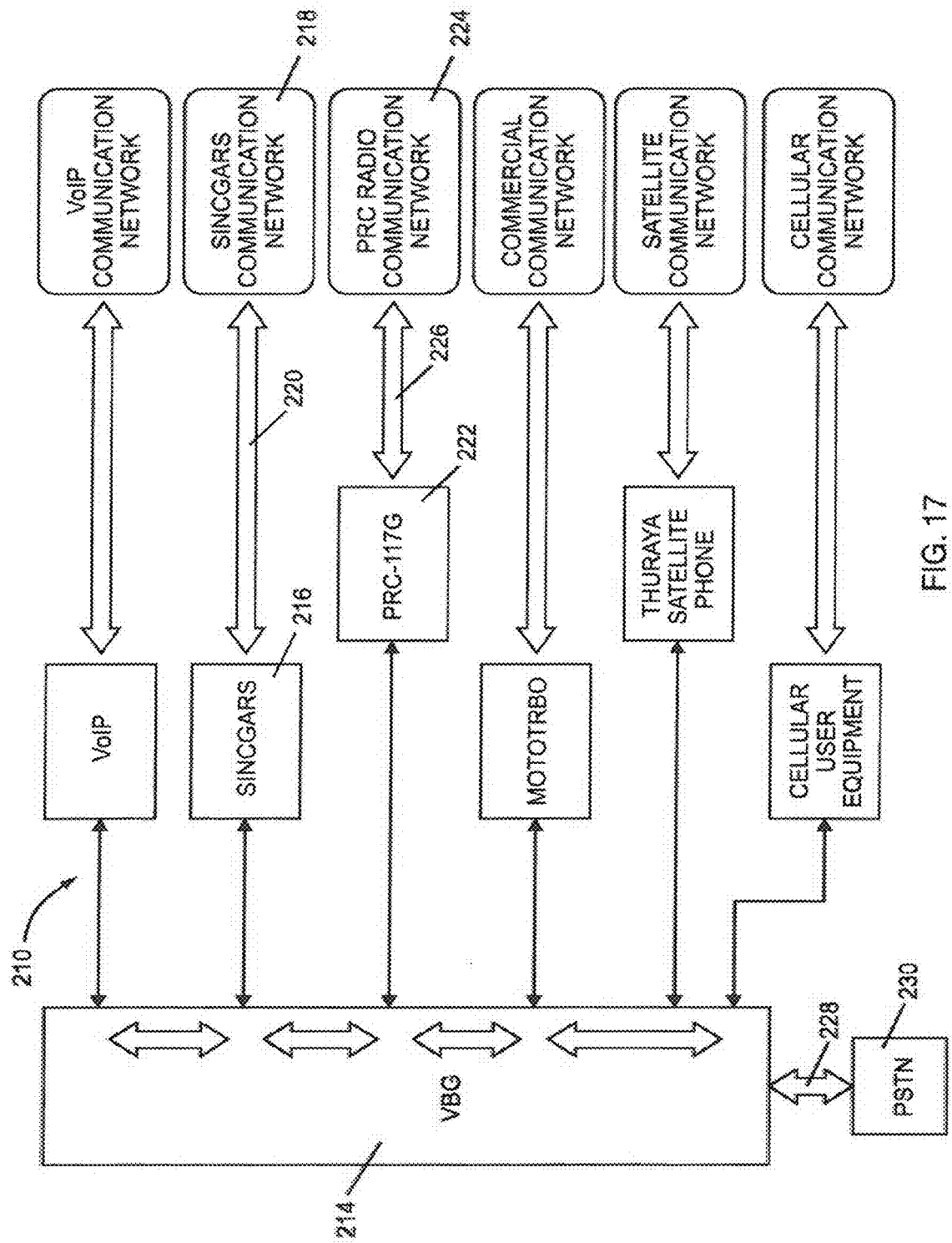
FIG. 17 is a block diagram illustrating an embodiment of a voice bride gateway (VBG) according to the invention.

FIG. 17 is a block diagram depicting operation of the VBG 210 to enable voice interoperability between disparate voice technologies, for example, SINCGARS to PRC-117G, and Thuraya Satellite Phone to VoIP, according to the invention. The VBG 210 combines various COTS products and available software in such a manner as to provide the warfighter with a variety of communication options. The VBG creates a network in which voice or audio signals transmitted over radio frequency (RF) channels from legacy and commercial radios, and VoIP soft phones, may be distributed selectively among all the connected radios and phones. To carry out such functions, the VBG 210 incorporates, e.g., an open Phone Branch Exchange (PBX) application such as Asterisk and conventional communications protocols such as SIP (Session Initiation Protocol).

In the disclosed embodiment, the VBG 210 is implemented on a server 214 having, inter alia, a number of USB ports configured to receive voice or audio signals originating from one or more network radios having standard audio connectors (e.g., type U-229), after the signals are converted into a digital format by USB Radio Adapters (URAs) connected to each port as described below. The USB ports are also configured to direct voice or audio signals originating from a given network radio through the connected URAs to the audio connectors of other network radios with which the given network radio is to be bridged. For example, pin B of the mentioned U-229 connector is used as an analog audio output or speaker terminal for the associated radio, pin D is the radio's analog audio input or mic terminal and, when grounded, pin C activates push-to-talk (PPT) operation for the radio. See, http://www.prc68.com/l/U229PO.shtml.

Accordingly, in FIG. 17, if a SINCGARS radio 216 in a SINCGARS radio communication network 218 using defined wireless RF channels 220 and transmission protocols, is to be voice bridged with a PRC-117G radio 222 in a PRC radio communication network 224 that uses different RF channels 226 and protocols, the VBG 210 can bridge audio signals originating from any radio in either communication network for reception by the radios in the other network. Another desirable feature of the VBG 210 is its ability to bridge audio from one or more different network radios with a mobile, fixed, or other remote phone by use of a plain old telephone system (POTS) communication cable 228 that connects the server 214 with a public switched telephone network (PSTN) 230.

Figure 18:
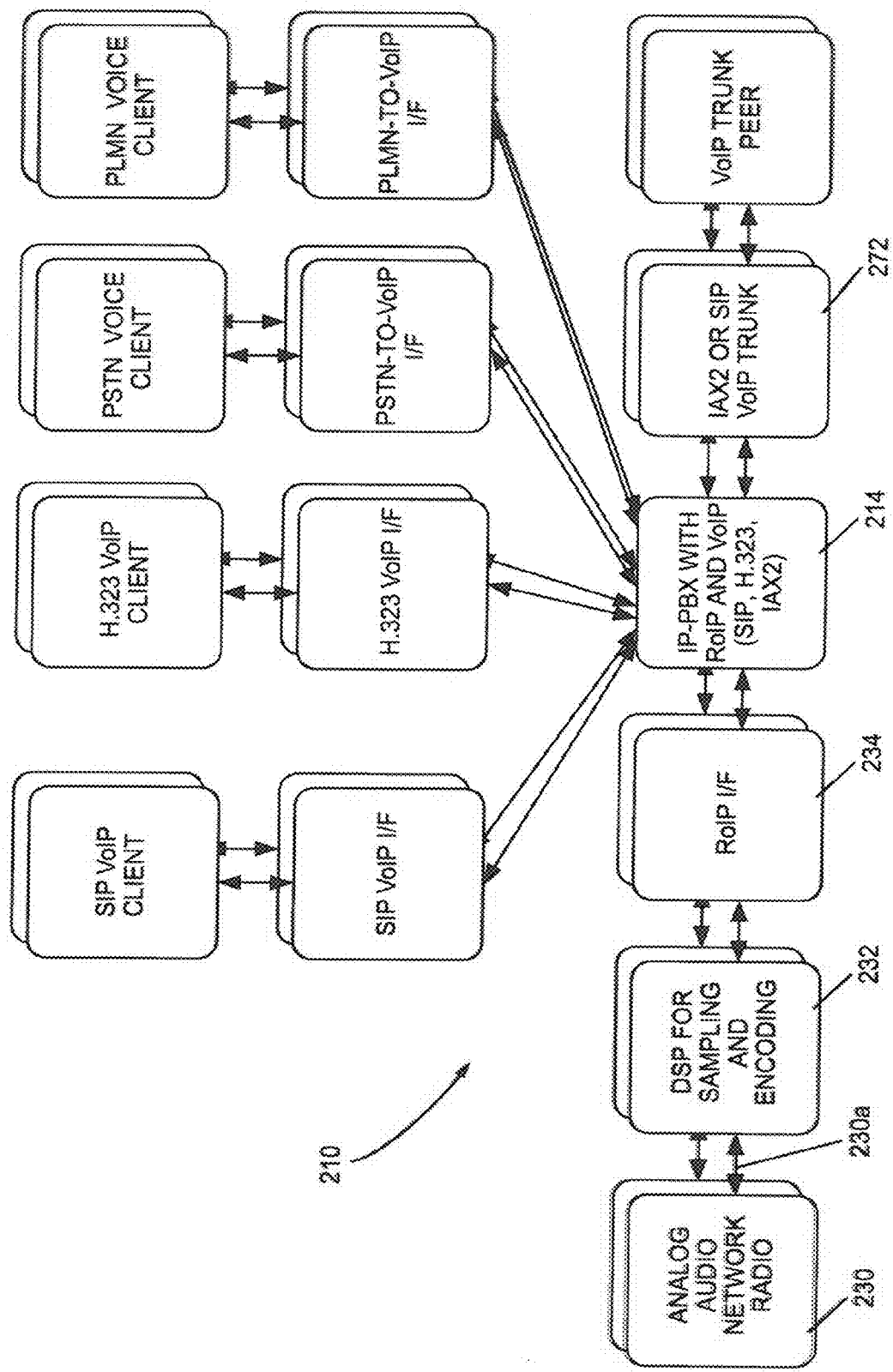
FIG. 18 is a block diagram of an architecture for the VBG.

FIG. 18 shows a preferred architecture for the VBG 210. Persons skilled in the art will understand that other architectures may also be devised and used to practice the present invention.

In FIG. 18, one or more network radios 230 each has a defined audio (e.g., headset or speaker) terminal, and a defined microphone (mic) terminal, for example, pins B and D of the mentioned U-229 connector. Each network radio 230 may be located in the vicinity of the VBG 210, and be in the form of a military or commercial PTT type two-way radio that operates to (a) monitor one or more voice channels of its associated network, and (b) transmit audio or voice signals over the channels wherein the voice signals originate from radios of other networks and/or mobile or fixed telephones linked with the VBG 210, and are selected by the VBG for transmission over the network radio's channels.

The PLMN-to-VoIP I/F in FIG. 18 may be H.323, SIP or PSTN. For example, in legacy cellular networks, a circuit-switched portion of the PLMN is routed through a mobile switching center (MSC) and onto a PSTN. If a PLMN is connected to (e.g., UMTS) or integrated with (e.g., LTE) an IP Multimedia Subsystem (IMS) core, then the PLMN-to-VoIP I/F will be SIP.

As used herein, the terms voice and audio are used interchangeably to refer to intelligible voice messages transmitted by users of radios or other communication devices (e.g., wired or wireless telephones) linked with the VBG 210, as well as audible or sub-audible tones that are transmitted alone or together with voice messages for purposes of network access, audio frequency shift keying and/or other conventional communication techniques.

Nomenclature used to label the blocks in FIG. 18 is as follows:
DSP—Digital Signal Processor
RoIP—Radio over Internet Protocol
VoIP—Voice over Internet Protocol
SIP—Session Initiation Protocol—an IETF voice call control protocol
H.323—ITU Standard for VoIP signaling, control, and transport
IAX2—Inter-Asterisk Exchange Protocol v.2
IP-PBX—Internet Protocol Private Branch Exchange
PSTN—Public Switched Telephone Network
I/F—interface Analog audio supplied from the audio terminal of each network radio 230, is supplied through an associated cable 230a to a USB radio adapter (URA) 232. The URA 232 operates to sample and digitally encode analog audio signals detected by the associated network radio 230 on its network channels. Such encoding preferably obtains a 64 bit PCM full rate digital audio stream in a standard Radio over Internet Protocol (RoIP) format. The RoIP digital audio from the URA 232 is applied through a RoIP interface 234 within the VBG server 214 and is processed by the PBX application (e.g., Asterisk) on the server. Voice or audio to be transmitted by the network radio 230 over its associated network channels, is output from the RoIP interface 234 in the server 214 and converted into analog form by the URA 232. Analog audio from the URA 232 is applied through the cable 230a to the microphone terminal of the network radio 230.

Figure 19:
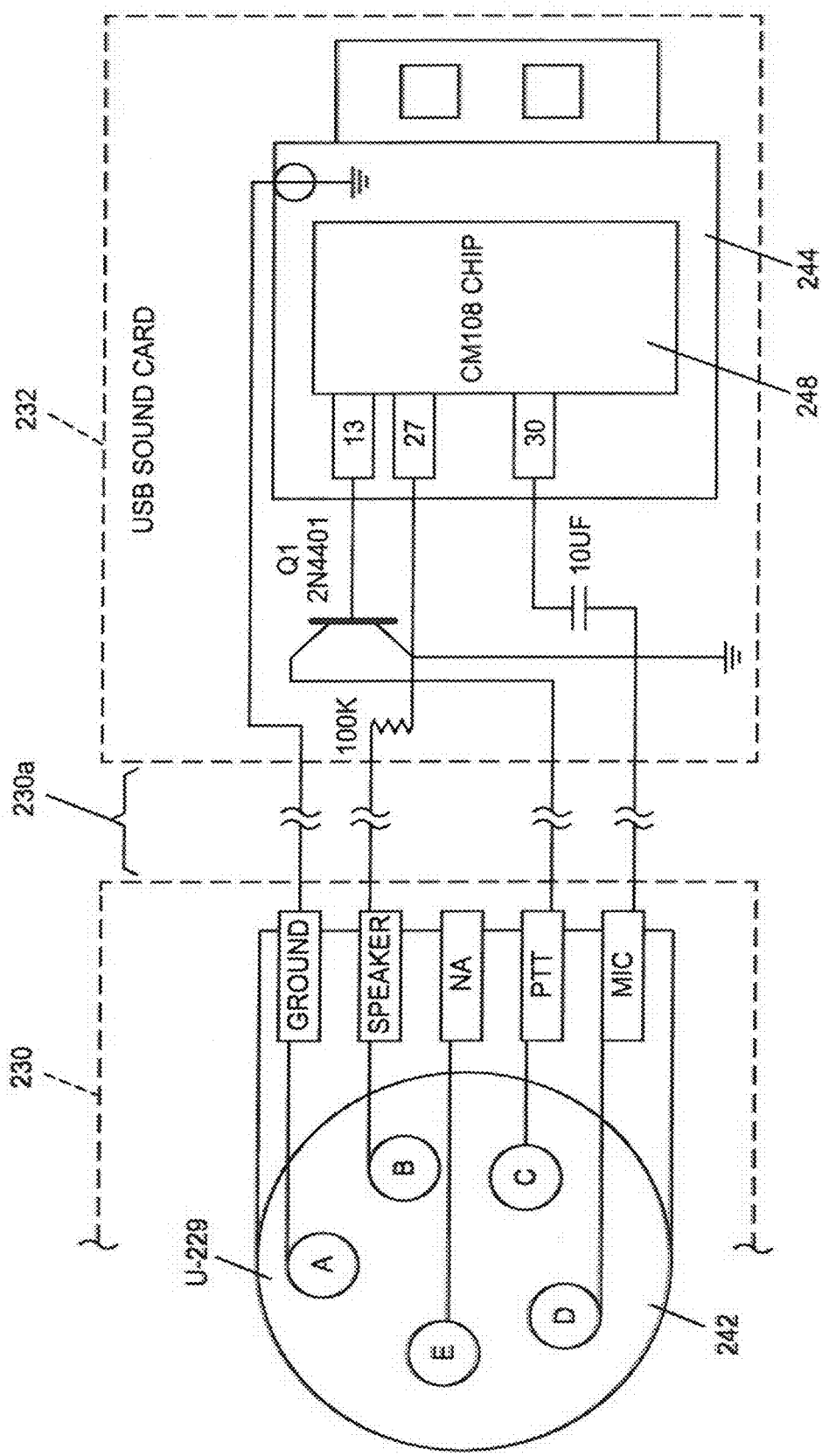
FIG. 19 is a schematic diagram of a first embodiment of a USB radio adapter (URA) and associated cable according to the invention.

FIG. 19 is a schematic diagram showing the radio cable 230a in FIG. 18 terminated at one end with a type U-229 audio plug connector 242 for electrically connecting to a mating connector on a network radio 230. The cable 230a is terminated at the other end with a USB sound card 244 with certain discrete components to define the URA 232 in FIG. 19. The sound card 244 is preferably built around a USB audio input/output (I/O) controller such as, e.g., a type CM108 or CM119 integrated circuit chip 248 available from C-Media Electronics Inc., in Taiwan. Note that the cable 230a connects the speaker pin B of the plug connector 242 to an AI (audio in) pin no. 27 of the chip 248 through a 100 K-ohm resistor, and connects the mic pin D of the connector 242 through a 10 uf capacitor to an AO (audio out) pin no. 230 of the chip 248. Pin no. 13 of the chip 248 is configured to drive a switching transistor Q1 so as to ground the PPT pin C of the plug connector 242 through the cable 230a.

Figure 20:
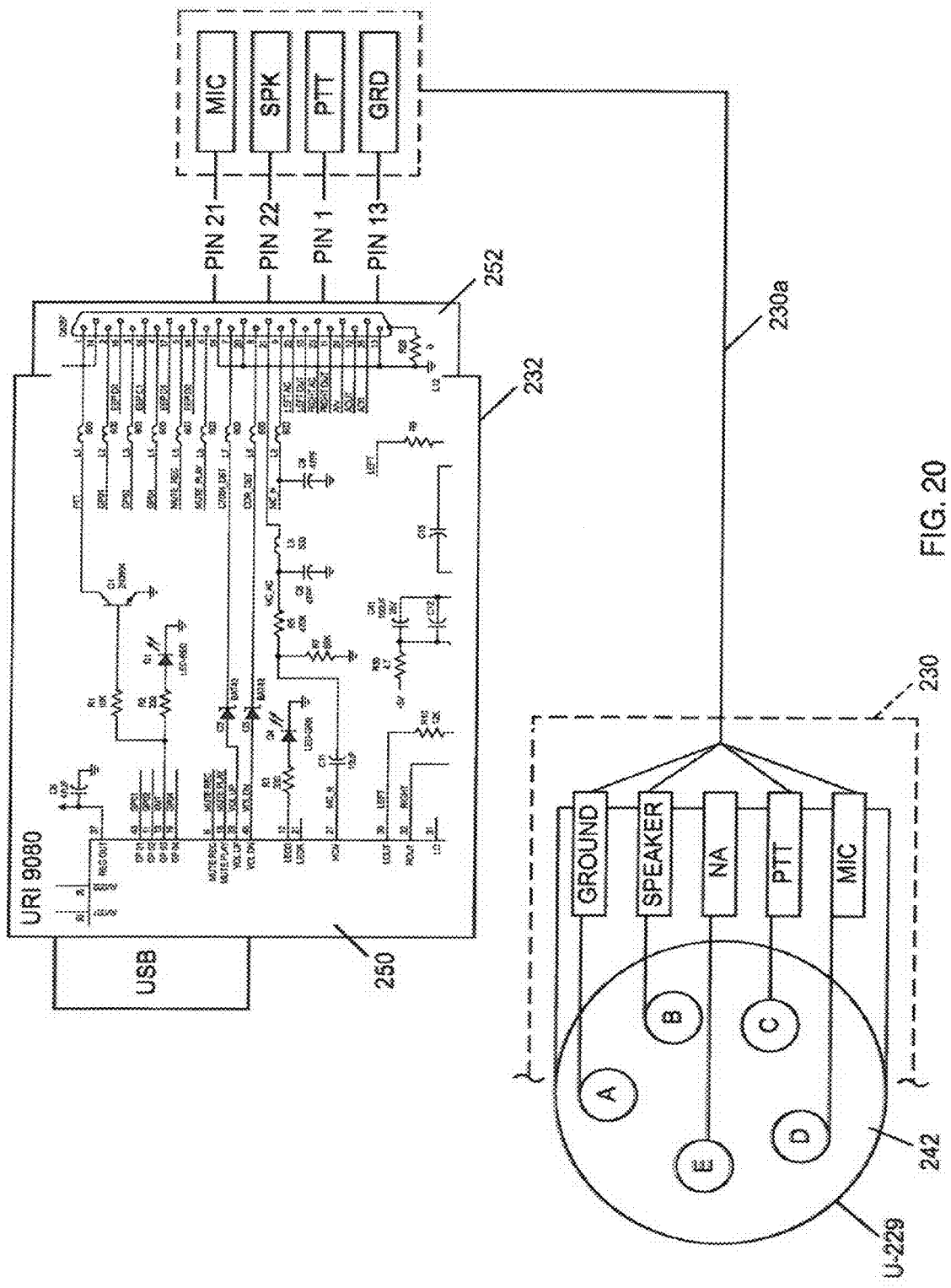
FIG. 20 is a schematic diagram of a second embodiment of a URA and associated cable according to the invention.

FIG. 20 is a schematic diagram of another embodiment of the radio cable 230a in FIG. 3. As in FIG. 19, the cable 230a is terminated at one end with a type U-229 audio plug connector 242 for electrically connecting to a mating connector on a monitor radio 230. The other end of the cable terminates with a type 9080 USB radio interface (URI) 250 available from DMK Engineering Inc. of Rancho Palos Verdes, Calif. 90275. The DMK 9080 URI is also built around the mentioned CM108 USB audio I/O controller chip, and is provided with a standard DB-25 pin connector 252 for cable connection. Conductors in the cable 230a connect to the following pins of the DB-25 connector on the DMK 9080 URI:

| URI DB-25 Pin | Function | Connect to U-229 Pin |
|---|---|---|
| 1 | PTT | C |
| 13 | GND | A |
| 21 | Mic (AC coupled) | B (Speaker) |
| 22 | Speaker (AC coupled) | D (MIC) |

Connecting the VBG Radio Cables

One or more USB radio cables 230a terminated as in either FIG. 19 or FIG. 20 may be used with the VBG 210. For the system to operate properly, it may be necessary to attach the USB connector end of the cable to a corresponding USB port on the server 214 before the server is turned on. As mentioned, the server 214 may have, e.g., four USB ports on a back panel wherein each port is configured to interface with the URA 232 on a different USB radio cable 230a. See FIG. 21. The USB ports can be numbered and associated with different extension numbers, as in the following example. The ports may also be configured manually if desired.

USB Port No.
19=Port 1=Device 4-1=6001=Extension 9101
20=Port 2=Device 4-2=6002=Extension 9102
21=Port 3=Device 3-1=6003=Extension 9103
22=Port 4=Device 3-2=6004=Extension 9104

In the above configuration, for example, a SIP user can dial 101 and the VBG 210 will operate to connect the user with the network radio 230 to which port 1 is connected, through the corresponding cable 230a. The user may then communicate with other radios on the same network as the network radio 230 linked to Port 1, and with radios on other networks that are bridged with Port 1 using, e.g., a [*] key on the keypad of his/her device to key push-to-talk (PTT) operation of the radio 230 and transmit, and a [#] key to un-key the PTT operation and receive.

USB Radio Adapter Status Lights

The URAs 232 may be configured to include status lights to indicate if a given adapter is communicating with the VBG server 214 properly. For example, a steady red light may indicate that the adapter is not configured, while a blinking red light indicates the device is operating properly and is talking to the system.

Radio Group Settings

Figure 23:
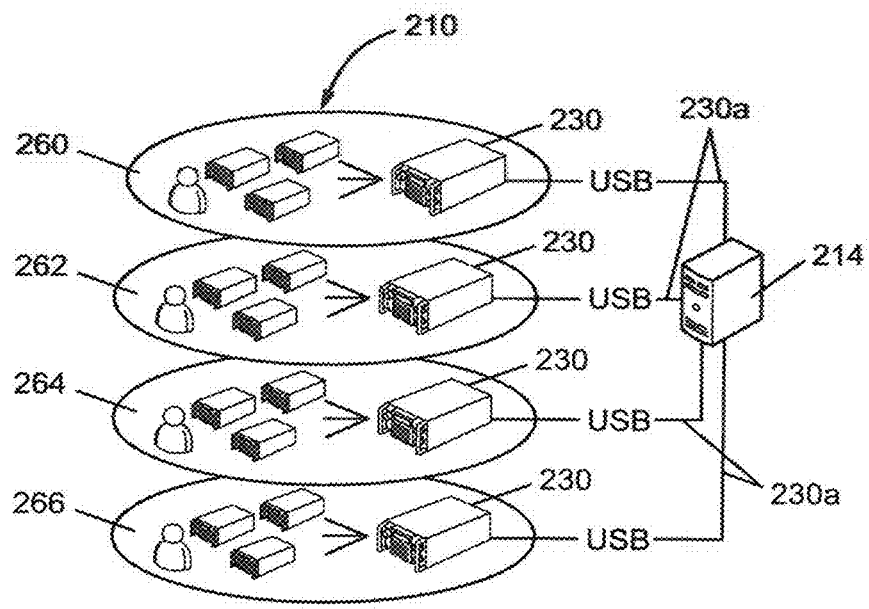
FIG. 23 shows the four radio networks in FIG. 22 in an independent or unbridged configuration.

As seen in the table of FIG. 22, the VBG 210 can implement any one of, e.g., 16 different bridging configurations for four different voice communication networks 260, 262, 264, 266 shown in FIG. 23. A desired bridging configuration may be defined on the VBG server 214 by using a configuration command such as, e.g., saint rpf.sh together with the desired configuration.

In the configuration of FIG. 23, each network is independent, i.e., the radios in each network are not bridged with radios in any of the other three networks. An example of a configuration command syntax to achieve the independent configuration of FIG. 23, is:
[root@localhost~]#saint_rpt.sh radio1_2_3_4

Figure 24:
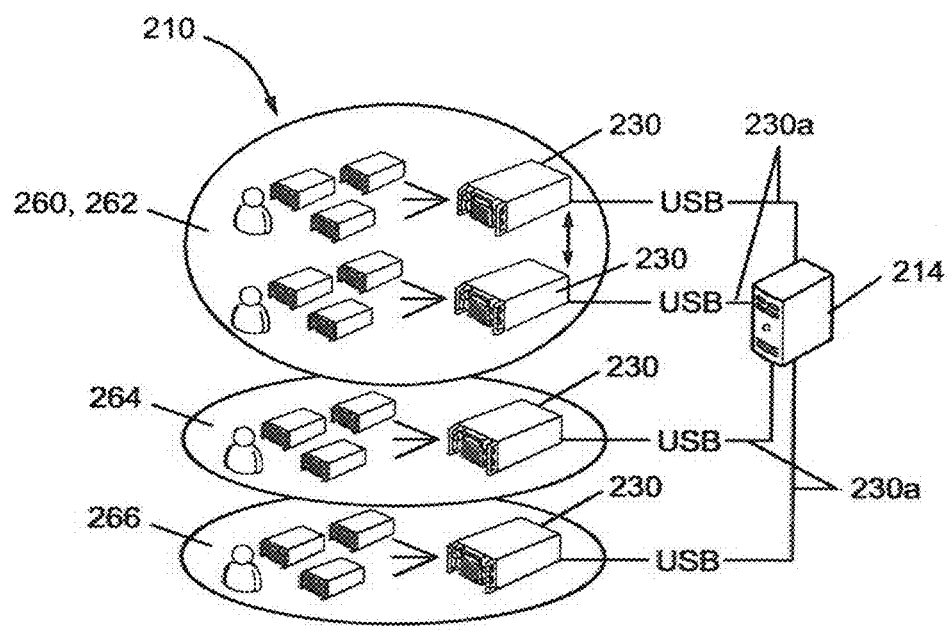
FIG. 24 shows two of the networks in FIG. 22 when bridged with one another.

FIG. 24 shows a configuration in which the radios in network 260 and the radios in network 262 are bridged, while the radios in networks 264 and 266 are not bridged out of their respective networks. A corresponding configuration command is then, for example;
[root@localhost~]#saint_rpt.sh radio12_3_4

It will be understood that with the appropriate command, configurations in which the radios of all four networks 260, 262, 264, 266 are bridged with one another, or where the radios in a given network are bridged with the radios in one or more other selected networks, can be implemented.

POTS Line Connection to PTT Radios

The VBG 210 preferably has a standard telephone connector 270 (e.g., type RJ-14) mounted on a panel of the server 214 as in FIG. 21. To enable an outside user who can access an available public switched telephone network (PSTN) with a wired or wireless phone and wants to communicate with the VBG over the POTS line 228 in FIG. 17, the telephone connector 270 on the server 214 must be connected through a phone line or cable to an active PSTN jack in the vicinity of the server.

Calling the VBG from a Phone

Once connected to a PSTN network, the VBG server 214 may be programmed to be called from any phone (a cell phone or an internal telephone handset) that has access to the PSTN. When called, the server may answer after, e.g., two rings, and a pre-recorded announcement can state: "Welcome, enter the extension of the person you are trying to call." A number of extensions may be available for use, as follows:

| Extension | Description |
| --- | --- |
| 9101 | Radio Network 60; Cable Port 19 |
| 9102 | Radio Network 62; Cable Port 20 |
| 9103 | Radio Network 64; Cable Port 21 |
| 9104 | Radio Network 66; Cable Port 22 |
| 8050 | Conference Room |

Radio Signal Training the VBG 210

Each time a new network radio 230 is linked with the VBG 210, certain steps should be followed to set appropriate threshold levels for voice signals and for noise that will be input to the VBG. The settings may be accomplished in a known manner using a commercially available calibrated radio communications test set, or a separate radio frequency signal generator and a modulation analyzer.

To begin a signal training session for a given network radio 230 and its associated RF channel(s), and if the mentioned Asterisk software is incorporated, a command such as the following is entered in the VBG;

[rootlocalhost-]#asterisk-vvvr

The particular network radio to be trained among, e.g., four radios identified as usb, usb1, usb2, and usb3, may be selected by entering, e.g;

>radio active usb2 to select the network radio associated with usb2. A menu list of options is then displayed, including setting voice signal and noise level thresholds for the URA 232 associated with usb2.

To make an input noise level adjustment for the URA associated with usb2, the corresponding network radio 230 must be turned on with no voice signal being received on its assigned frequency. Because the URA is connected to receive the radio's unfiltered and unsquelched voice output, the URA is subject to a maximum amplitude white noise signal from the radio. A command such as the following is then entered;

>radio tune rxnoise

The VBG server 214 is preferably configured to adjust the input threshold of the URA in view of the radio's output noise signal, and to display a Success message if the configuration is accepted.

To make a voice level adjustment for the URA 232, a command such as

>radio tune rxvoice is entered and a strong, on-channel, full-quieting RF signal modulated by a one KHz tone at 60% modulation is received by the network radio 230 associated with usb2. For example, a user of another radio on the same network may say "ahh-hhh" for five seconds. The VBG 210 adjusts the threshold level of the URA for voice modulation, and outputs a Success message when the configuration is accepted. After each configuration change, the edited configuration may be saved using a command such as, e.g., >radio tune save If the mentioned Asterisk PBX software is incorporated in the VBG 210, it may be required to restart the Asterisk service in order to apply the edited configurations, by entering:

>amportal kill

If the VBG monitor screen closes, a new screen may be opened upon entering:

>amportal start

Full Radio Tune Menu List and Description

The following commands may be used to invoke the described functions:

radio active—Selects by name a specific USB radio adapter (URA) for display or tuning (e.g., usb, usb1, usb2, or usb3).

radio tune—Displays information about a current active network radio 230.

radio tune rxnoise—Automatically adjusts the selected URA input sensitivity to match the maximum noise signal output from the connected network radio 230. This is the audio from the radio when no RF signal is present on the radio's receive frequency. If the USB adapter 232 is connected directly to an unmated and unfiltered demodulated audio output terminal of the radio 230 and no RF signal is present on the radio channel, then this is the open channel reference signal. If the connection to the radio is not via an unsquelched and unfiltered audio output terminal, the maximum noise signal can be obtained by user controls to unmute the radio and open the squelch.

radio tune rxvoice—To set a selected URA radio voice level adjustment, transmit an on-channel, strong, full-quieting RF signal modulated by a 1 KHz tone at 60 percent of maximum modulation.

radio tune rxsquelch—This sets the selected URA radio noise squelch sensitivity. It provides a measurement of the current signal strength as a reference value. For example, if a configuration is needed, entering this command can display the current no-signal strength and the current squelch setting. Enter the command "radio tune rxsquelch xxx" where "xxx" is the current signal strength reading plus 150. The squelch setting can be tested and a final adjustment made later.

radio tune txtone—This sets the modulation amplitude of a sub-audible tone or data that is transmitted simultaneously with a voice signal.

radio tune txvoice—This sets the modulation amplitude of the voice signal by generating a reference signal of 1 KHz at a 60 percent modulation level.

radio tune save—This saves adjustments made to a configuration file for a specific channel. The adjustments are automatically loaded when the VBG server 214 is restarted.

As disclosed herein, it will be appreciated that the SAINT VBG 210 provides a reliable, low cost interface among recent protocols for IP voice communications, as well as standard H.323, SIP, PSTN, and any analog voice system. Moreover, two or more VBG servers 214 may be situated at determined locations in a defined geographic region, wherein each VBG server is linked with one or more network radios 230, and the servers are connected through a VoIP trunk 272 in FIG. 18. It will also be appreciated that such a configuration can enable all of the radio networks linked to the connected VGB servers to be bridged in a desired configuration by the combined operations of the servers.

Further, it will be understood that the VGB 210 can support voice level detection (i.e., VOX) so that PTT operation via the [*] and the [#] keys on a telephone touch pad is not necessary required. PTT operation by way of the [*] and [#] keys is preferred, however, since it has been found to provide significantly better performance.

SAINT Personal Networking Node (PNN)

As mentioned earlier, the inventive SAINT system also provides geo-referenced information including maps for display on a COTS cell phone or other lightweight hand held device easily carried by the warfighter. This component is referred to herein as a Personal Networking Node or PNN, and is described in further detail below.

A business person's lifeline in the commercial world comprises business calls and conferencing, pictures and product information, driving directions, instant messaging, streaming video, e-mail and data. By contrast, a soldier's lifeline on the battlefield must handle voice communications and orders, human source intelligence (HUMINT) imagery and graphics, battlefield maps, situational awareness, text messaging, e-mail and data, and calls for fire or to adjust fire. The SAINT PNN can support the warfighter's needs through a COTS handheld wireless device that is programmed and configured to include:

1. Applications and features such as secure voice, text, and situational awareness with extended battery life;

2. Maximum connectivity when carried in a vehicular network, a stand alone vehicle, or in an isolated squad; and 3. Extended functionality including imagery, video and targeting, access to the Lower Tactical Internet (LTI) and Global Information Grid (GIG) services, and infrastructure roaming.

In a preferred embodiment, the inventive PNN incorporates the Extensible Messaging and Presence Protocol (XMPP), which is an open standard communications protocol based on Extensible Markup Language (XML). Previously called Jabber, XMPP was originally developed for near real time extensible instant messaging (IM), presence information, and contact list maintenance. Being extensible, XMPP is currently applied in Voice over Internet Protocol (VoIP) and file transfer communications. XMPP resides in the application layer of the Internet protocol suite. Detailed specifications for XMPP are set out in Internet Engineering Task Force (IETF) requests for comment (RFCs) 3920 to 3923 (October 2004) and are incorporated herein by reference.

PNN also preferably employs the Session Initiation Protocol (SIP), which is widely used for controlling multimedia communication sessions such as voice and video calls over Internet Protocol. SIP is a text based protocol commonly used for creating, modifying and terminating unicast or multicast sessions of one or more media streams. Other applications include video conferencing, streaming multimedia distribution, instant messaging, presence information, file transfer and on-line games. Like XMPP, SIP resides in the application layer of the Internet protocol suite. Since SIP is independent of the underlying transport layer, it can run using Transmission Control Protocol (TCP), User Datagram Protocol (UDP), or Stream Control Transmission Protocol (SCTP). Detailed specifications for SIP are set out in IETF RFC 3261 (June 2002) and are incorporated herein by reference.

XMPP, SIP, GPS, and voice and imaging technologies are combined in PNN in such a manner as to communicate situational awareness information to any warfighter equipped with a COTS handheld device (e.g., cell phone, PDA or UMPC) having a display screen, and access to an information network of interest (e.g., the Internet or a tactical IP-based network) via a cellular base station or IEEE 802.11 (Wi-Fi), or through tactical or first responder radios to which the device is arranged to be tethered. The device is operative to provide the warfighter with geo-registered blue force and red force tracking, targeting and imaging (still and video), voice, IM text, information sharing, event recording, and event playback to a community of users.

Figure 25:
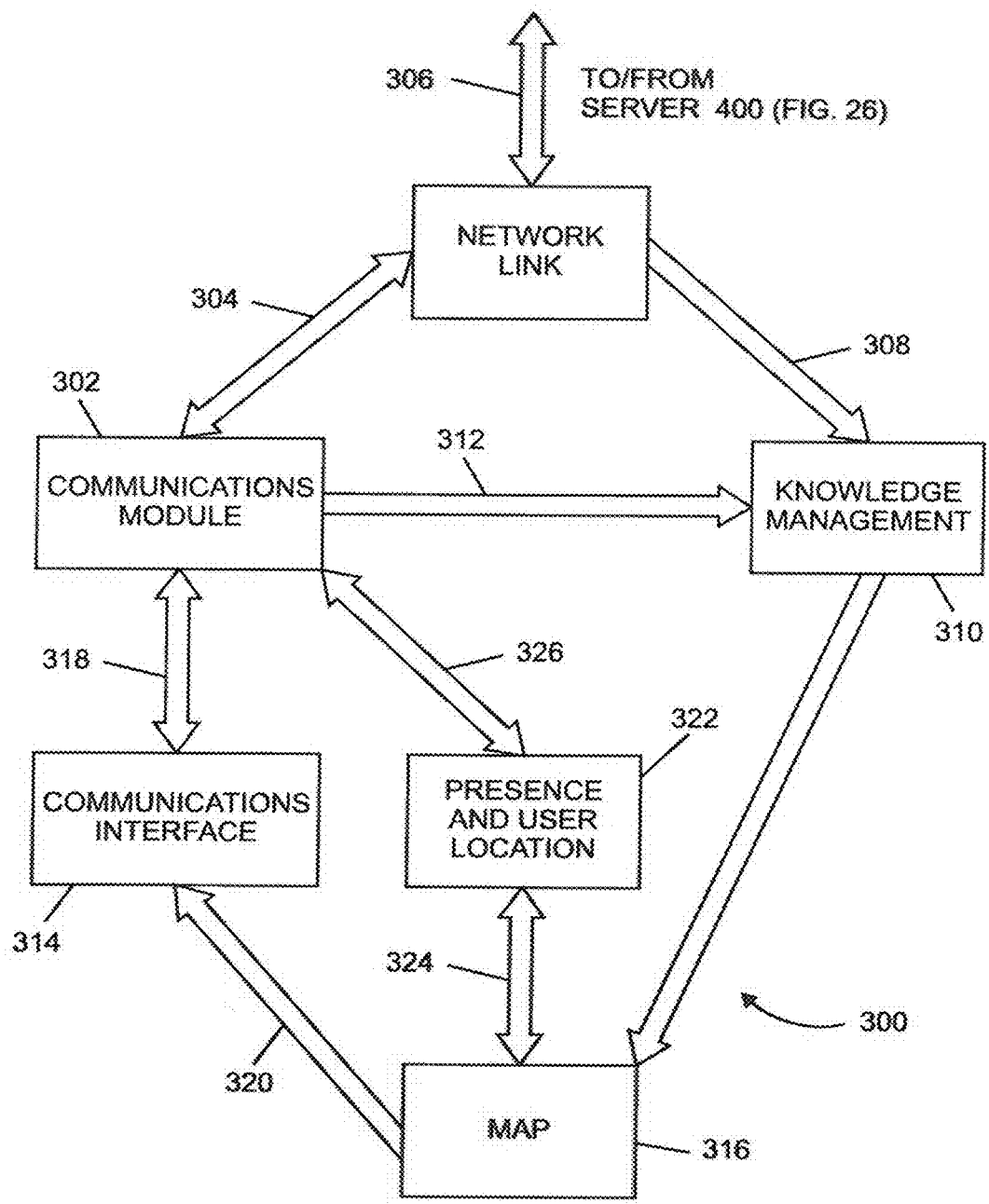
FIG. 25 is a schematic block diagram of a personal network node (PNN) communications radio or device, according to the invention.
Figure 26:
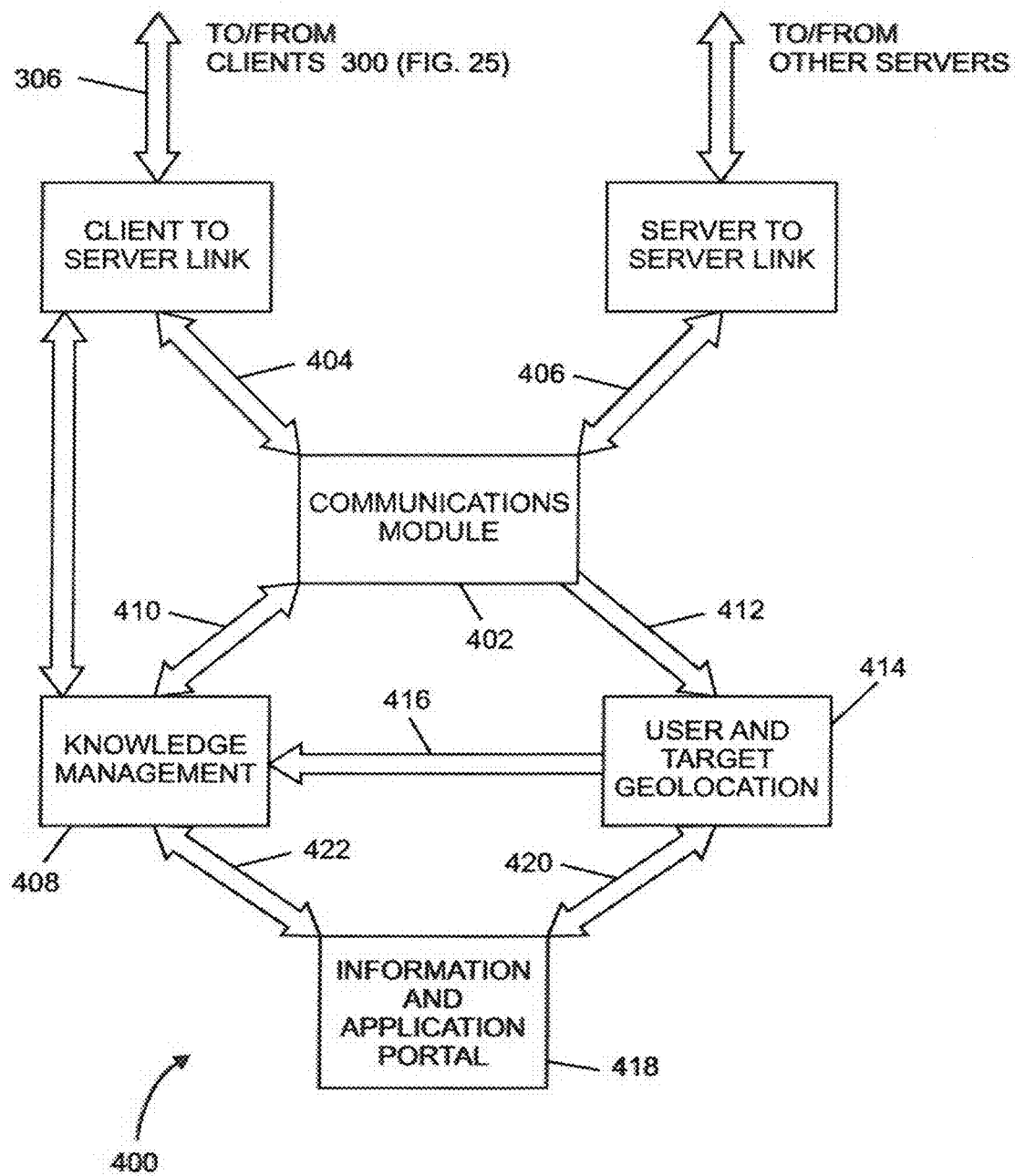
FIG. 26 is a schematic block diagram of a PNN server configured to link with the communications radio or device of FIG. 25, according to the invention.

FIG. 25 is a functional block diagram of a PNN radio or other communications device 300 that is programmed and configured to provide a warfighter with the situational awareness information enumerated above in a convenient, light weight package according to the invention. FIG. 26 is a functional block diagram of a PNN server 400 or equivalent data processing platform according to the invention, wherein the server 400 is programmed and configured to link with the device 300 and to provide communications and situational awareness information for the device user with updates at regular intervals.

The PNN radio or device 300 is preferably in the form of a COTS light weight, touch screen, programmable smart phone such as, without limitation, the earlier mentioned HTC Touch. The device 300 has a communications module 302 that is configured to establish a secure XMPP and/or SIP communication link 304 via the information network of interest 306, to an XMPP or SIP communications module 402 in the PNN server 400 in FIG. 26. For security, it is preferred that the communication link 304 between each PNN radio 300 and the PNN server 400 be configured as part of a virtual private network (VPN) and/or incorporate other known encryption mechanisms. In one preferred embodiment, the PNN device 300 is programmed and configured to store, among other applications, the known Windows Mobile operating system (OS) including GPS functionality, and local map imagery preferably in the form of geo-referenced JPEG files. Other mobile operating systems may also be used, e.g., Android, as well as embedded operating systems depending on the form of the device 300.

In FIG. 25, certain knowledge management (KM) alerts 308 originating directly from the PNN server 400 are transmitted through the network 306 to a knowledge management module 310 in the PNN radio 300. Other KM alerts 312 are sent to the KM module 310 directly from the communications module 302 in the radio 300.

A communications interface 314 is configured in the PNN radio 300, between the communications module 302, and a map application 316 that is programmed to display a number of menu options for selection by a user of the radio as detailed below. The communications interface 314 is operative to initiate communications with the PNN server 400 through the communications module 302. The interface 314 handles a flow of information or data 318 to be communicated to the PNN server 400 from the map application 316 in response to selected menu options 320. The map application 316 also receives certain alerts addressed to the user of the radio 300 from the PNN server 400, through the knowledge management module 310.

The PNN radio or device 300 also has a presence and user location module 322 configured between the communications module 302 and the map application 316. The location module 322 is operative to send data 324 corresponding to the geographic location of a given user of the device and the locations of targets identified by the given user via the map application 316, to the communications module 302 for forwarding to the PNN server 400. The location module 322 also serves to provide data 326 originating from the PNN server 400 and corresponding to the locations of other PNN device users (i.e., buddies of the given user), their presence or availability for text chat or voice, and targets identified by the other users, to the map application 316 running in the given user's device.

As seen in FIG. 26, the communications module 402 in the PNN server 400 is configured to send information to, and to receive information from, one or more PNN devices 300 (or clients) that link at 404 with the module 402 via the network of interest 306 (e.g., the Internet or a tactical IP-based network). If desired, the communications module 402 of the PNN server 400 may also link at 406 with other servers that are programmed and configured to exchange messages, data and other tactical information including imagery to and from the PNN server 400. Such information is preferably exchanged through the SAINT multi-message translator (MMT) described above.

The PNN server 400 also has a knowledge management (KM) module 408 for receiving certain KM events that are sent from users of PNN radios or devices 300 via SIP/XMPP. Such events include, without limitation, alerts, user locations, and targets. The KM module 408 also receives such events directly from the communications module 402 of the server at 410.

The communications module 402 forwards (at 412) messages containing geolocation information to a user and target geolocation module 414, which messages include the locations of users of the devices 300, targets, and images with GPS locations. The user and the target locations are forwarded (at 416) from the geolocation module 414 to the KM module 408.

An information and application portal 418 in the PNN server 400 is configured to share (at 420) geolocation data including GPS embedded images with the user and target geolocation module 414. The portal 418 signals the knowledge management module 408 (at 422) that information or applications are available through the portal, and allows a given user of the PNN device 300 to access the information and applications based on the user's role and current situation.

Example

Client Application for the PNN Device 300

Figure 27:
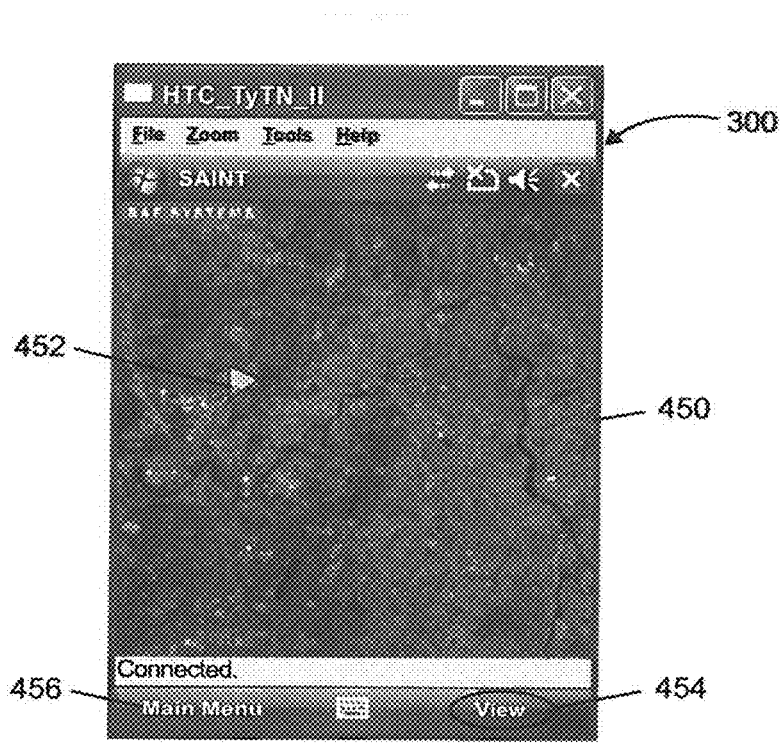
FIG. 27 is a map display on a screen of the communications device of FIG. 25.

If the communication link 304 to the PNN server 400 is configured for a virtual private network (VPN), the client application for a given PNN device 300 will initially prompt the user to enter a VPN username and a VPN password when the application is first run, followed by a second prompt for the user to log in by entering another username and password set. Once the device links with the PNN server 400, a map 450 is displayed on the device as in FIG. 27. The map 450 shows the user's locale, and an arrow 452 displayed on the map points to the location of the user. The user is given an option of choosing either a view menu 454 (FIG. 28) or a main menu 456 (FIG. 35) by selecting a corresponding button at the bottom of the screen in FIG. 27.

Figure 28:
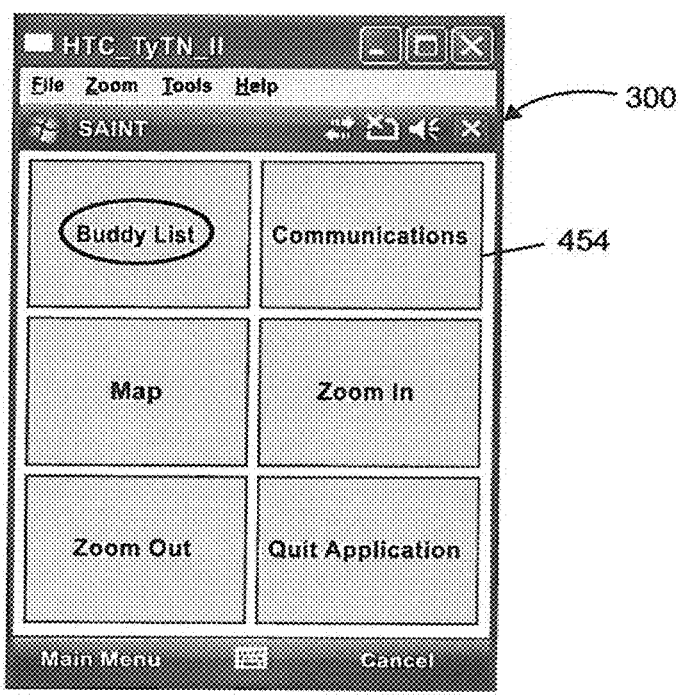
FIG. 28 is a view menu display on the device screen.

When choosing the view menu 454 in FIG. 28, the user may select any of the following functions by name in the menu 454; (i) Buddy List, (ii) Communications, (iii) Map, (iv) Zoom In, and (v) Quit Application. These menu functions are preferably configurable. Additional functions may be added, or existing functions may be removed.

(i) Buddy List

Figure 29:
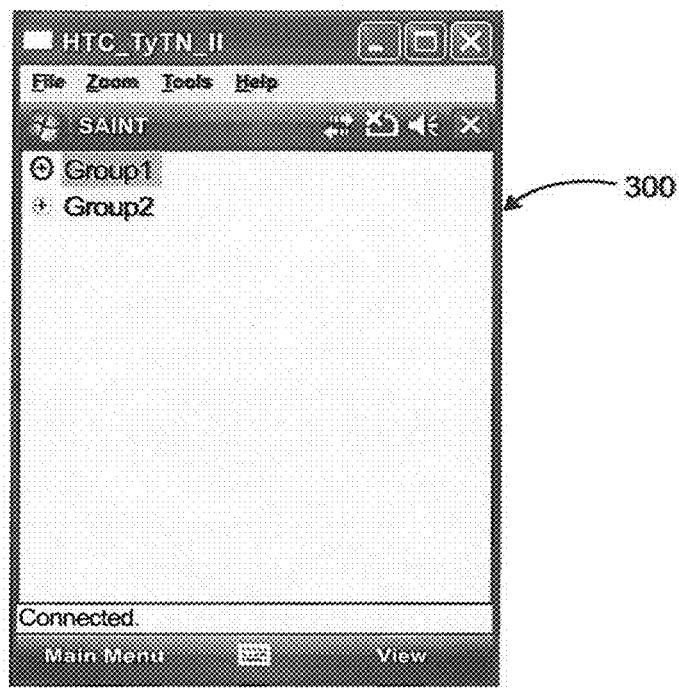
FIG. 29 is a screen display of numbered groups of buddies of a user of the inventive device of FIG. 25.
Figure 30:
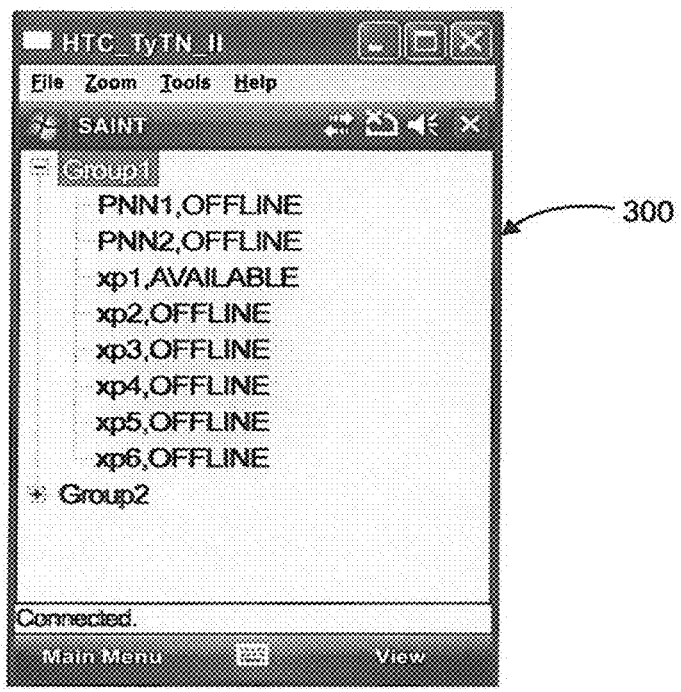
FIG. 30 is a screen display of the buddies of a selected group, and the current status of the buddies.

As seen in FIGS. 29 and 30, a given user's buddies may be divided into two or more numbered groups. The selection of a given group by the user, e.g., Group 1, causes a list of all buddies in Group 1 to be displayed with their present status (offline or available) as in FIG. 30. The background color of the display in FIG. 30 may signify whether or not the user's radio or device 300 is linked to the PNN server 400. For example, a light green background may indicate an active server connection, while a light red background indicates no connection.

Figure 31:
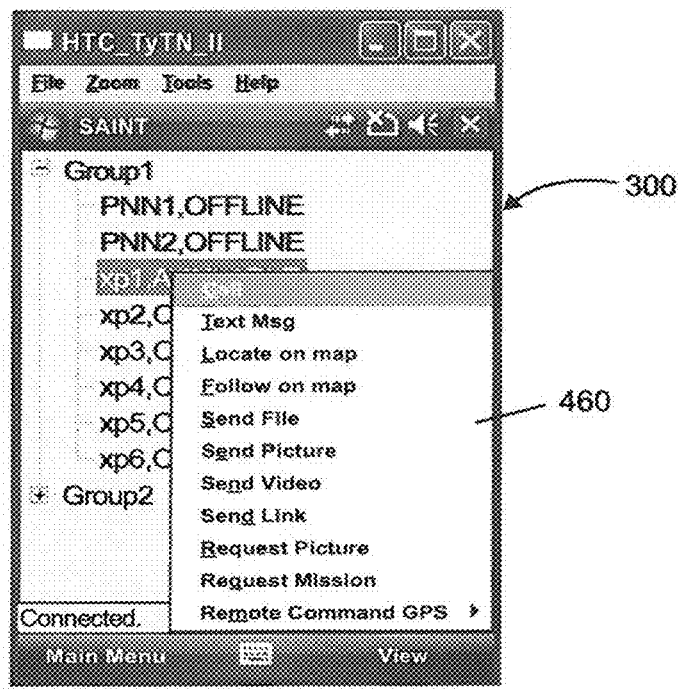
FIG. 31 is a screen display of communications actions that can be taken by a user of the device of FIG. 25 with respect to a selected buddy.

The user selects an available buddy with whom he or she wants to communicate by touching the buddy's ID on the display screen, or by highlighting the buddy and pressing enter. Upon doing so, a context menu 460 is displayed as in FIG. 31. The menu 460 affords the user a number of communications options, as follows:

Call—Places a voice call to the selected buddy.
Text Msg—Brings up a text message window for the buddy.
Locate on Map—Centers a map on the buddy's last location (if available).
Follow on Map—Continually centers on the buddy's location on each update.
Send File—Brings up a dialog to send a file to the buddy.
Send Picture—Brings up a camera. After taking a picture, sends file.
Send Video—Brings up the camera. After taking video, sends whole video file. May not be used to stream video.
Send Link—Allows the user to send a link. This may display as a text message.
Request Picture—Forces selected buddy to take a picture autonomously and to upload it. This option may be limited to buddies whose radios 200 use Windows Mobile for an OS, and is useful for placing a remote node and retrieving pictures.
Request Mission—Queries selected buddy for his or her current mission (waypoints and areas of interest), and downloads mission file.
Remote command GPS—Allows the user to turn a remote user's GPS function on or off.

(ii) Communications

Figure 32:
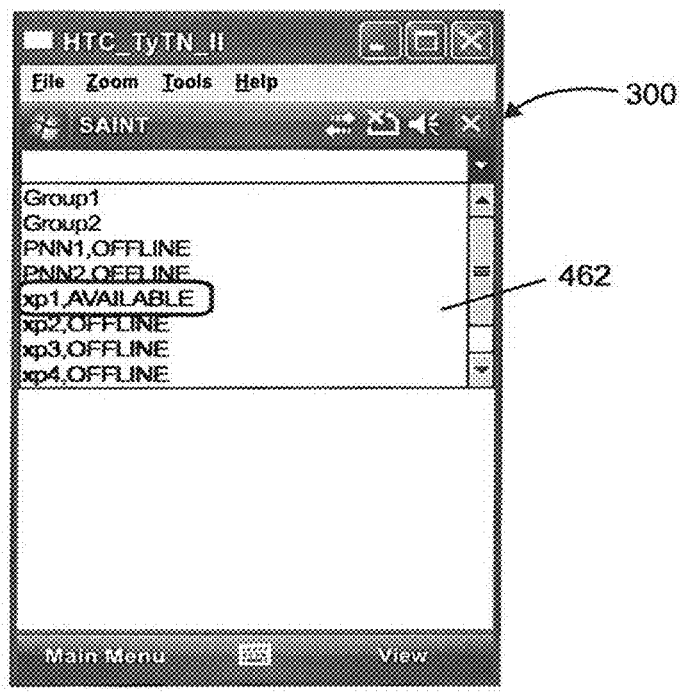
FIG. 32 is a screen display of buddies or groups to whom a user of the device of FIG. 25 can send a text message or place a voice call, according to the invention.
Figure 34:
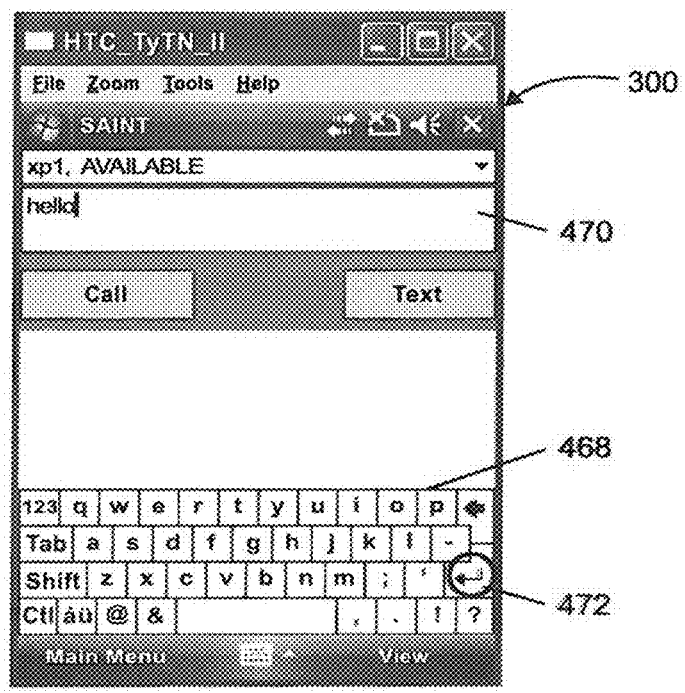
FIG. 34 is a device screen display including a prepared message field.

When selecting the communications function in the view menu 454 in FIG. 28, the user can pull a dropdown list 462 of buddies with their current status as shown in FIG. 32. Upon selecting a buddy, a screen as in FIG. 31 queries the user via buttons 464, 466 as to whether he/she wants to place a call or send a text message to the buddy. If the text button 466 is selected, a keyboard 468 is displayed at the bottom of the screen, and the user prepares a message that is displayed in a message input box 470 at the top of the screen as shown in FIG. 34. When done, the user presses an enter key 472 on the keyboard 468, and the prepared message is transmitted to the selected buddy through the PNN server 400 via the network linking the user's PNN device 300 with the PNN server, and the link established between the buddy's radio and the server.

Figure 35:
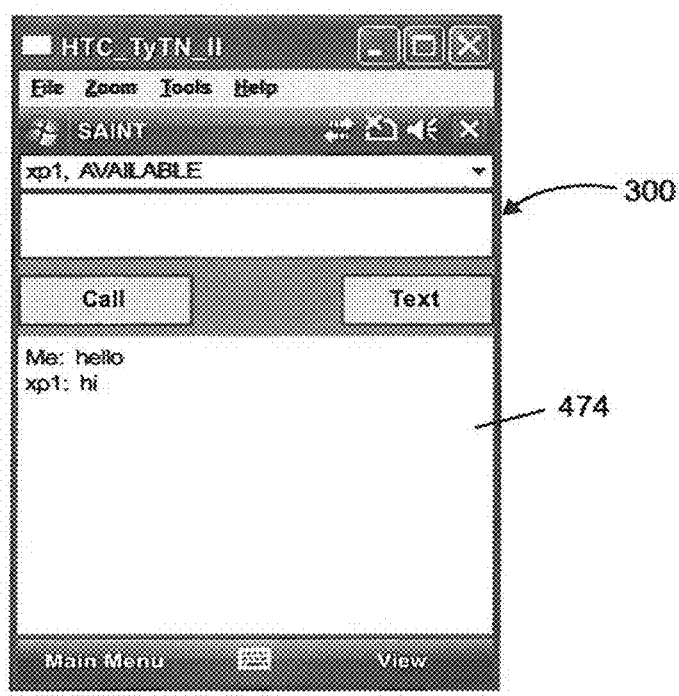
FIG. 35 is a screen display showing instant messaging (IM) text exchanged between a user of the device of FIG. 25 and a selected buddy, according to the invention.

Text is transmitted from the user's device 300, and text is received from a buddy's radio, preferably in an instant messaging (IM) format and displayed within a messaging field 474 of the screen as shown in FIG. 35. Note that a text message is ordinarily sent to the buddy currently selected in the dropdown list 462 in FIG. 32.

Figure 33:
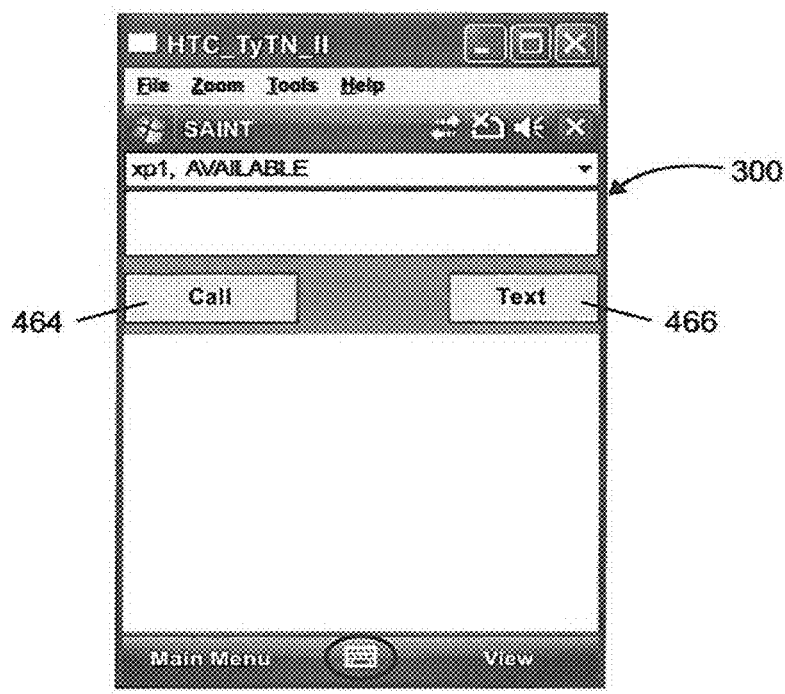
FIG. 33 is a screen display showing call and text option buttons for selection by a user of the device of FIG. 25.

If after selecting a buddy from the dropdown list 462 in FIG. 32 the user wants to place a voice call to the buddy, the user touches the call button 464 in FIG. 33. Voice data is then exchanged between the user and the selected buddy. If the configured voice protocol is Voice over IP, then the call set-up occurs via XMPP or SIP through the PNN server 400, and the corresponding network links 306 between the server and each of the user's and the buddy's radios.

Figure 36:
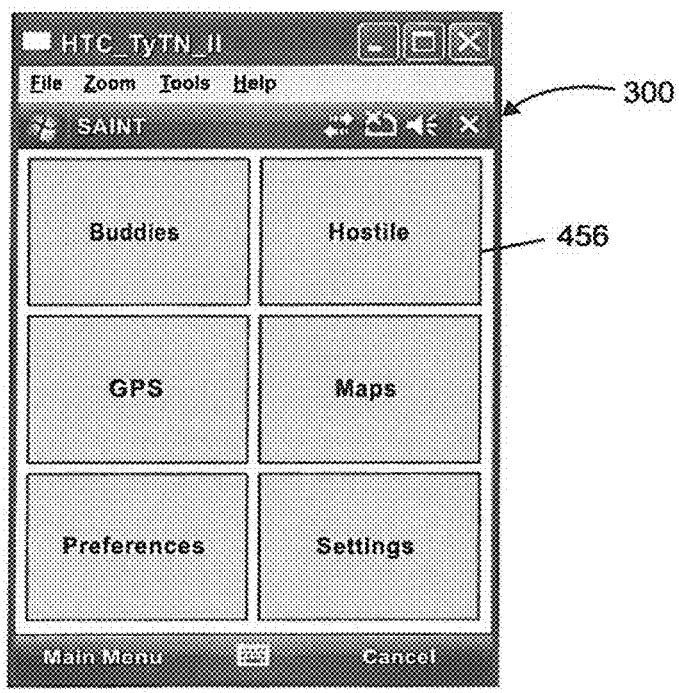
FIG. 36 is a main menu display on the device screen.

When choosing the main menu 456 in FIG. 36, the user can select any of the following primary functions; (i) Buddies, (ii) Hostile, (iii) GPS, (iv) maps, (v) Preferences, and (vi) Settings. The main menu options are preferably configurable. The order of the options may be changed, additional options may be added, or existing options may be removed. The main menu 456 is used basically for selecting actions and configuring settings.

(i) Buddies. Selecting Buddies allows the user to implement the following:
 Call—Brings up dialog to select a buddy and place a call.
 Text—Brings up dialog to select a buddy and send a text message.
 Locate—Brings up dialog to select buddy and center on their last position.
 Send File—Brings up dialog to select a buddy and send a file.
 Send Picture—Brings up dialog to select a buddy and send a picture.

(ii) Hostile. Selecting Hostile allows the user to implement the following:
 Add Target—Changes to Map menu. Adds a target at the next clicked location.
 Move Target—Brings up a menu of targets to be moved. After selecting a target, the target is moved to the next clicked location.
 Rmv Target—Brings up a menu of targets. Selected target will be deleted.
 Target Info—Brings up a menu of targets, then displays dialog containing information on a selected target.
 Remove All Local—Removes all targets on the local map (does not delete from PNN server).

(iii) GPS. Selecting GPS allows the user to implement the following:
 Start GPS—Starts GPS device.
 Stop GPS—Stops GPS device.
 Com Port—Changes COM port used by the GPS device.
 Baud—Changes the Baud rate of the COM port. Recommended not to be changed.
 Where am I—Displays dialog with last reported latitude and longitude.

(iv) Maps. Selecting Maps allows the user to implement the following:
 Center on GPS—Centers and locks map on local GPS position. To exit locked mode double click on map.
 Draw>
 Line—Click once for a start point of a line to be drawn, and the second click will place an end point of the line.
 Rectangle—First click defines one corner, second click defines a second corner.
 Circle—Placement of click defines the center of a drawn circle.
 Delete Obj—Click on a drawn object to delete it.
 Clear Drawings—Deletes all drawings.
 Map Select—Brings up dialog to select a map for use.
 Mission Planning—Brings up a context menu in a map.
 GotoLocation—Allows the user to input latitude and longitude, respectively, in decimal degrees (−74.313 . . . 40.235)

(v) Preferences. Selecting Preferences allows the user to implement the following:
 Login Information—Allows the user to change login information (username, password, server, voice server, and alias).
 Alerts—Allows the user to select the type of alert given when a text message is received. For example, sound (on or off).
 Cell/Sip Calls—Allows the user to use either cellular service or SIP (VoIP) service.
 Colors—Allows the user to select colors for use on the map.
 PTT Button—Allows the user to configure a hardware push to talk button (VoIP Only).

(vi) Settings. Selecting Settings allows the user to implement the following:
Declutter>
 Friendlies—Toggles whether or not friendlies are displayed.
 Hostiles—Toggles whether or not hostiles are displayed.
 Neutrals—Toggles whether or not neutrals are displayed.
 Sensors—Toggles whether or not sensors are displayed.
 Unknown—Toggles whether or not unknowns are displayed.
 Users—Toggles whether or not users are displayed.
Resize>
Icons>
 Small—Configures map icons to be small.
 Medium—Configures map icons to be default size.
 Large—Configures map icons to be large.
Text>
 Small—Configures buddylist text to be small.
 Medium—Configures buddylist text to be default size.
 Large—Configures buddylist text to be large.
System>
 About—Shows information about the client.

Figure 37:
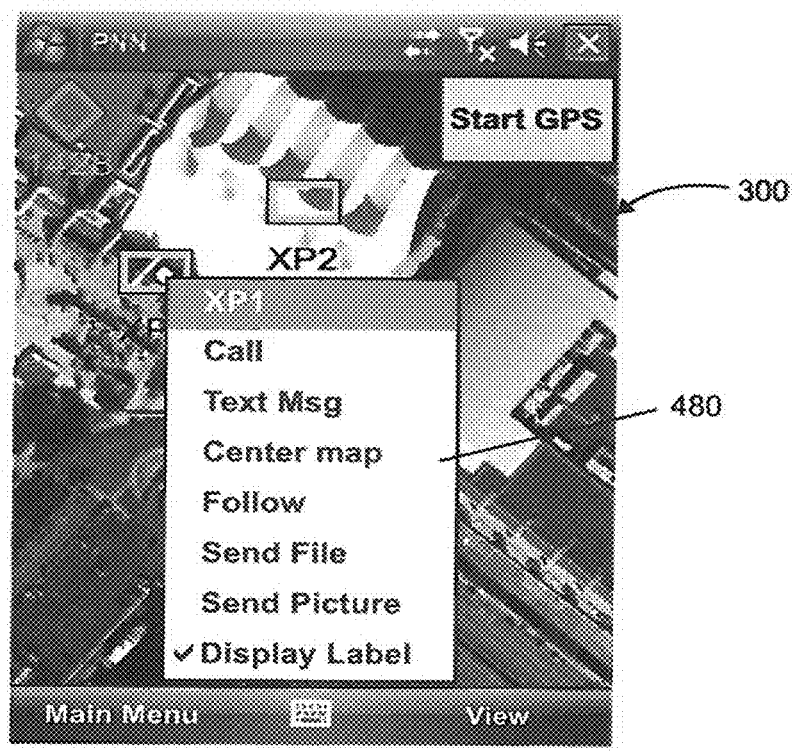
FIG. 37 is a screen display of a map with a first drop down context menu.
Figure 38:
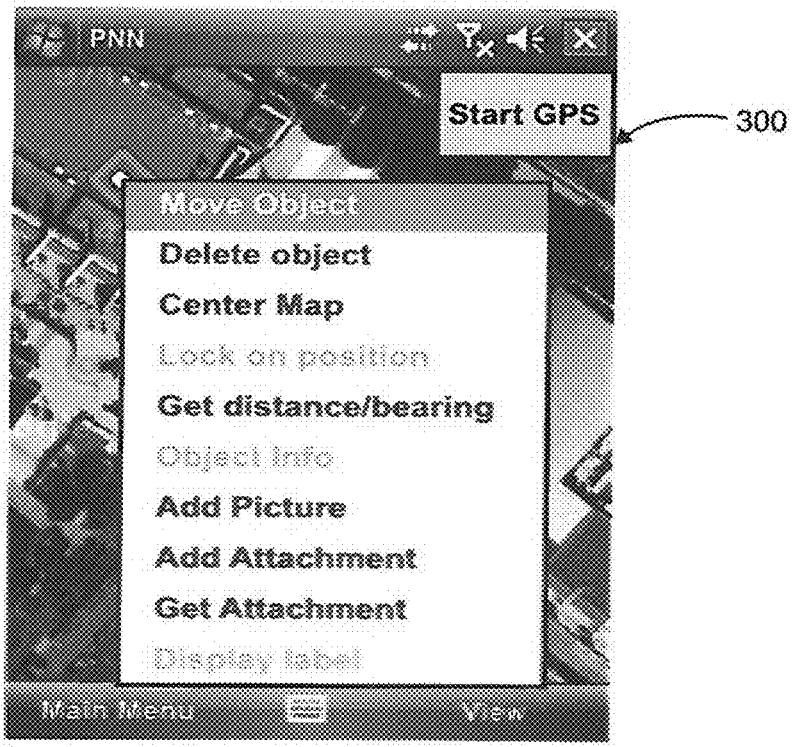
FIG. 38 is a screen display of a map with a second drop down context menu.

FIG. 37 is a screen display of a map, with a first drop down context menu 480 allowing a user of the PNN device 300 to select a desired action with respect to a selected buddy. FIG. 38 is a screen display of another map, with a second drop down context menu 482 allowing a user of the PNN device to select a desired action with respect to a selected target.

Those skilled in the art will appreciate that the SAINT PNN radios or devices 300 together with one or more PNN servers 400 can provide a low cost, location based, tactical communications service for dismounted soldiers. XMPP, SIP, GPS, voice, and known imaging technologies are used in such a manner as to provide the warfighter with tactical situational awareness information and data on a COTS handheld device with cellular or IEEE 802.11 access, or by tethering the device to existing first-responder or tactical radios that have access to an information network such as the Internet or a tactical IP-based network.

It will also be appreciated that the inventive SAINT network including the MMT, the VBG and the PNN described above, will provide a reliable location based communication system for dismounted soldiers and their chain of command at relatively low cost. With SAINT, commercial technology and networks are leveraged so that a warfighter can obtain geo-referenced services including maps, and voice and text messaging capability on COTS handheld devices such as smart phones or PDAs. Different types of communications equipment, devices, networks and information transmission protocols are made to work together to obtain a common operating picture and a unified communications environment within and across a community of users.

While the foregoing represents preferred embodiments of the invention, those skilled in the art will understand that various changes and modifications may be made without departing from the spirit and scope of the invention, and that the present invention includes all such changes and modifications as are within the scope of the following claims.

The invention claimed is:

1. A system for enabling interoperability among various kinds of communications equipment, networks, and information transmission formats in a tactical environment, comprising:
   a multi-message translator (MMT) constructed and arranged for translating a source text message having a first set of word fields defined according to a source message format, into a sink message having a second set of word fields defined according to a sink message format;
   a voice bridging gateway (VBG) constructed and arranged for bridging multiple voice communication networks having associated transmission protocols that are incompatible with one another;
   a personal networking node (PNN) server connected with at least one of the MMT and the VBG, wherein the PNN server is configured to link with a remote client and to communicate text or voice tactical information to and from the device, and the tactical information is routed through one or both of the MMT and the VBG; and
   a handheld device that forms the remote client, and the handheld device comprises:
   a programmable processor for controlling modules and components of the client, wherein the processor is programmed and configured according to a mobile or an embedded operating system and has GPS functionality;
   a viewing screen;
   a network interface;
   a communications module coupled to the network interface and configured to establish a communication link with the PNN server;
   a knowledge management (KM) module coupled to the network interface and to the communications module, wherein the KM module is configured to receive alerts originating from the server and from the communications module of the device;
   a map application coupled to the KM module and to the viewing screen, wherein the application is configured to display a number of menu options for selection by the user;
   a communications interface coupled between the communications module and the map application, wherein the communications interface is operative to (i) initiate communications with the server through the communications module, (ii) handle a flow of information or data to be communicated to the server from the map application in response to a menu option selected by the user, and (iii) receive alerts sent to the device from the server, through the KM module of the radio; and
   a presence and user location module coupled between the communications module and the map application, wherein the location module is operative to (i) send data corresponding to a location of the user and locations of targets identified by the user via the map application, to the communications module for forwarding to the server, and (ii) provide data originating from the server and corresponding to locations of other device users, the presence or availability of the other users to exchange text or voice messages with the user, and targets identified by the other users, to the map application in the device.

2. A system according to claim 1, wherein the communications module of the handheld device is configured to operate according to the Extensible Messaging and Presence Protocol (XMPP) over the communication link established with the PNN server.

3. A system according to claim 1, wherein the communications module of the handheld device is configured to operate according to the Session Initiation Protocol (SIP) over the communication link established with the PNN server.

4. A system according to claim 1, wherein the communications module of the handheld device is configured to establish the communication link with the PNN server as a secure communication link.

5. A system according to claim 1, wherein the map application is configured to display a list of buddies of the user on the viewing screen in response to a buddy list command entered by the user.

6. A system according to claim 5, wherein the map application is operative to provide the user with a number of communications options on the viewing screen with respect to a given buddy, group of buddies, or other devices selected by the user.

7. A system according to claim 6, wherein the communications options include at least one of text messaging, voice calling, centering or following a selected buddy on a displayed map; sending text, image or video files; sending a link, requesting a picture, requesting a selected buddy's mission, and activating or deactivating a GPS function of a remote user.

8. A system for enabling interoperability among various kinds of communications equipment, networks, and information transmission formats in a tactical environment, comprising:
   a multi-message translator (MMT) constructed and arranged for translating a source text message having a first set of word fields defined according to a source message format, into a sink message having a second set of word fields defined according to a sink message format;
   a voice bridging gateway (VBG) constructed and arranged for bridging multiple voice communication networks having associated transmission protocols that are incompatible with one another; and
   a personal networking node (PNN) server connected with at least one of the MMT and the VBG, wherein the PNN server is configured to link with a remote client and to communicate text or voice tactical information to and from the device, and the tactical information is routed through one or both of the MMT and the VBG;
   wherein the MMT is configured to (i) define the common message format (CMF) as third set of word fields that corresponds to a union of the first and the second sets of word fields, (ii) for any given word field in the third set of word fields in the CMF, map information contained in a corresponding word field of the first set of word fields in the source message format, if any, to the given word field in the CMF, and (iii) and for any given word field in the second set of word fields in the sink message format, map information contained in a corresponding word field of the third set of word fields in the CMF, if any, to the given word field in the sink message format.

9. A system according to claim 8, wherein the MMT is configured to select a source of the source message from among multiple defined sources.

10. A system according to claim 8, wherein the MMT is configured to select a transport for the source message from among a plurality of defined transports.

11. A system according to claim 8, wherein the MMT is configured to select a sink for receiving the sink message from among multiple sinks.

12. A system according to claim 11, wherein the MMT is configured to select a transport for the sink message from among a plurality of defined transports.

13. A system according to claim 8, wherein the MMT is configured to:
  (i) select a source of the source message from among multiple defined sources;
  (ii) select a transport for the source message from among a plurality of defined transports;
  (iii) select a sink for receiving the sink message from among multiple sinks;
  (iv) select a transport for the sink message from among a plurality of defined transports; and
  (v) connect the selected source to the selected sink.

14. A system for enabling interoperability among various kinds of communications equipment, networks, and information transmission formats in a tactical environment, comprising:
  a multi-message translator (MMT) constructed and arranged for translating a source text message having a first set of word fields defined according to a source message format, into a sink message having a second set of word fields defined according to a sink message format;
  a voice bridging gateway (VBG) constructed and arranged for bridging multiple voice communication networks having associated transmission protocols that are incompatible with one another; and
  a personal networking node (PNN) server connected with at least one of the MMT and the VBG, wherein the PNN server is configured to link with a remote client and to communicate text or voice tactical information to and from the device, and the tactical information is routed through one or both of the MMT and the VBG;
  wherein the VBG comprises:
  a network radio configured to operate according to a transmission protocol of a radio communication network;
  the network radio has an audio terminal for outputting first analog voice or audio signals detected by the radio over a radio frequency (RF) channel of the network, and a microphone terminal for inputting second analog voice or audio signals for transmission by the radio over the network;
  a server or other processing platform that is programmed and configured to implement a private branch exchange (PBX) application for bridging the radio communication network with the telephone device;
  a radio adapter constructed and arranged for converting the first analog signals output from the audio terminal of the network radio into corresponding first digital audio signals, and for inputting the first digital audio signals to a selected port of the server;
  a telephone connector arranged on the server for connection with a public switched telephone network (PSTN), wherein a user of the remote client can access the server via the PSTN to bridge the device with the radio communication network by operation of the PBX application on the server; and
  the server and the PBX application operate together to (i) convert the first digital audio signals input to the selected port of the server from the radio adapter into corresponding second analog audio signals, (ii) apply the second analog audio signals to the telephone connector on the server, and (iii) apply voice or audio signals corresponding to signals from the remote client and input to the telephone connector, to the microphone terminal of the network radio.

15. A system according to claim 14, wherein the PBX application is configured to implement a push-to-talk (PTT) operation of the network radio.

16. A system according to claim 15, wherein the PBX application is configured to enable the user of the remote client to activate a transmit mode of operation of the network radio in response to a [*] symbol entered on the keypad of the remote client, and to activate a receive mode of operation of the network radio in response to a [#] symbol entered on the keypad.

17. A system according to claim 14, including a length of cable containing a number of conductors, wherein at least some of the conductors terminate at one end at corresponding terminals of the radio adapter, and terminate at the opposite end at the audio and the microphone terminals of the network radio.

18. A system according to claim 17, wherein the radio adapter is constructed and arranged for connection to a USB port on the PNN server.

* * * * *